United States Patent
Avula et al.

(10) Patent No.: US 10,397,184 B2
(45) Date of Patent: Aug. 27, 2019

(54) MOBILITY MANAGEMENT USING IDENTIFIER-LOCATOR ADDRESSING (ILA)

(71) Applicant: Verizon Patent and Licensing Inc., Arlington, VA (US)

(72) Inventors: Niranjan B. Avula, Frisco, TX (US); Kalyani Bogineni, Hillsborough, NJ (US); Ratul Kumar Guha, Kendall Park, NJ (US); Jignesh S. Panchal, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 129 days.

(21) Appl. No.: 15/792,521

(22) Filed: Oct. 24, 2017

(65) Prior Publication Data

US 2019/0124040 A1    Apr. 25, 2019

(51) Int. Cl.
*H04L 29/12*    (2006.01)
*H04W 8/28*    (2009.01)
*G06F 16/955*    (2019.01)
*H04W 80/04*    (2009.01)

(52) U.S. Cl.
CPC ........ *H04L 61/6059* (2013.01); *G06F 16/955* (2019.01); *H04W 8/28* (2013.01); *H04W 80/045* (2013.01)

(58) Field of Classification Search
None
See application file for complete search history.

(56) References Cited

U.S. PATENT DOCUMENTS

| | | | |
|---|---|---|---|
| 2015/0049719 A1* | 2/2015 | Qi | H04W 76/12 370/329 |
| 2015/0071169 A1* | 3/2015 | Wang | H04W 8/02 370/328 |
| 2015/0103746 A1* | 4/2015 | Matsushima | H04W 40/02 370/328 |
| 2016/0262197 A1* | 9/2016 | He | H04W 40/02 |
| 2017/0063678 A1* | 3/2017 | Rasanen | H04L 41/5054 |
| 2017/0208634 A1* | 7/2017 | Bharatia | H04W 72/0406 |
| 2017/0347251 A1* | 11/2017 | Kim | H04W 76/12 |
| 2018/0219783 A1* | 8/2018 | Pfister | H04L 45/745 |

* cited by examiner

Primary Examiner — Otis L Thompson, Jr.

(57) ABSTRACT

A device can receive, from a network device, a request to create an internet protocol (IP) session for a user device. The device can allocate an IP address for the user device and a first tunnel endpoint identifier associated with a tunnel. The IP address can include a first set of bits associated with a location identifier and a second set of bits associated with a device identifier. The device can provide a response to the network device, and can receive a request that includes a second tunnel endpoint identifier associated with the tunnel. The device can provide the IP address and the first and second tunnel endpoint identifiers to be stored using a data structure. The device can provide a response to the network device indicating to establish the downlink portion of the IP session, and can perform one or more actions associated with managing the IP session.

20 Claims, 13 Drawing Sheets

MOBILITY MANAGEMENT USING IDENTIFIER-LOCATOR ADDRESSING (ILA)

BACKGROUND

Using identifier-locator addressing (ILA), an internet protocol version 6 (IPv6) address can be split into a locator component and an identifier component. The locator component can indicate a physical location in a network for a device, and the identifier component can indicate a unique identity of the device.

DETAILED DESCRIPTION OF PREFERRED EMBODIMENTS

Figure 1A:
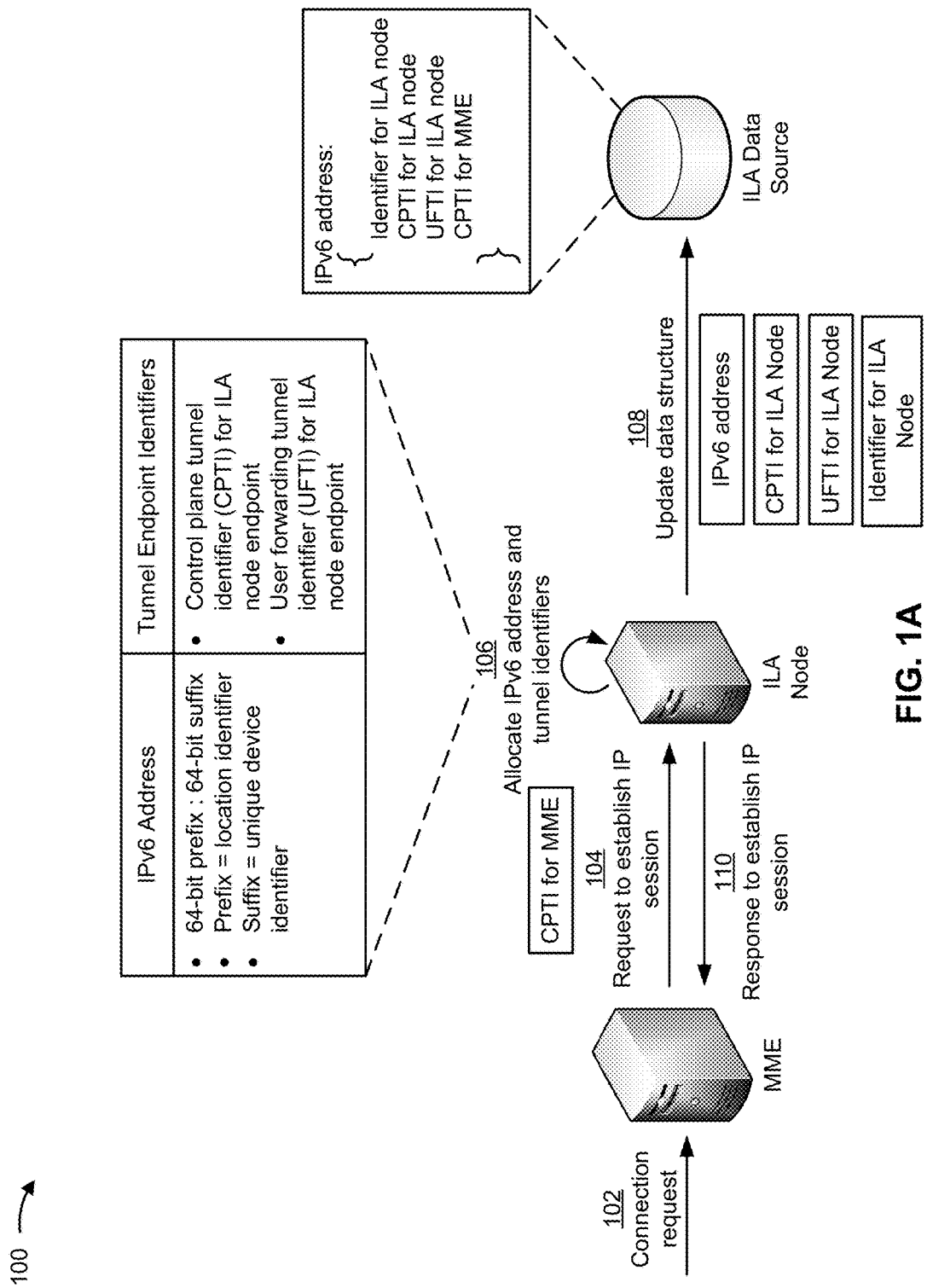
FIGS. 1A-1F are diagrams of an overview of an example implementation described herein.

The following detailed description of example implementations refers to the accompanying drawings. The same reference numbers in different drawings can identify the same or similar elements.

A network service provider can manage network connections of mobile devices by using a network device to monitor states of the mobile devices. For example, a packet data network (PDN) gateway (PGW) can monitor states associated with a set of mobile devices that are accessing network services. In this case, to ensure that session states are preserved (e.g., in the event the PGW crashes), multiple instances of the state can be stored by multiple PGWs that are located in different geographic locations.

Additionally, an increase in the popularity of internet of things (IoT) devices has drastically increased a total number of devices that access network services (e.g., to billions, or even trillions, of total devices). However, supporting multiple instances of IP session states for billions, or trillions, of devices can require a large amount of storage and/or processing resources.

One way to support IP sessions without storing session states is to utilize ILA. In ILA, an IPv6 address can be split into a locator component and an identifier component. The locator component can indicate a physical location in a network for a device, and the identifier component can indicate a unique identity of the device. By including both locator logic and identifier logic in the IPv6 address, one or more network devices can use the IPv6 address to make smarter routing decisions and manage IP sessions without storing session states.

Some implementations described here allow a set of ILA nodes and ILA routers to use ILA to support IP sessions for user devices. For example, an ILA node, of a set of ILA nodes, can receive, from a mobility management entity device (MME), a request to establish an IP session for a user device. In this case, the ILA node can use ILA to allocate an IP address to the user device. Additionally, the ILA node can allocate a set of tunnel endpoint identifiers for the ILA node, such that the tunnel endpoint identifiers can be used by other devices to make routing decisions during the IP session, as described herein. Furthermore, the ILA node can interact with the MME to establish the IP session, and can perform one or more actions associated with managing the IP session.

In this way, the ILA node is able to support the IP session without storing a session state. Additionally, the ILA node is able to support the IP session without the PGW and without a serving gateway (SGW). Furthermore, the ILA node conserves storage resources by supporting IP sessions without storing session states. Additionally, the ILA node reduces a utilization of processing resources and/or conserves network resources by storing tunnel endpoint identifiers in cache memory, thereby avoiding additional routing lookups during the IP session.

FIGS. 1A-1F are diagrams of an overview of an example implementation 100 described herein. As shown in FIGS. 1A-1F, example implementation 100 can use an ILA node and an ILA router to support mobility of a user device, without storing session states for the IP session being utilized by the user device.

As shown in FIG. 1A, and by reference number 102, a mobility management entity (MME) can receive a connection request from a base station. For example, the user device can provide a connection request to the base station, which can cause the base station to provide the connection request to the MME.

As shown by reference number 104, the ILA node can receive a request to establish an IP session from the MME. To enable network devices to send and/or receive traffic flow associated with the IP session, tunnels can be established between network devices, such as a first tunnel (e.g., a control plane tunnel) between the MME and the ILA node, and a second tunnel (e.g., a user forwarding tunnel) between the base station and the ILA node. The purpose of establishing tunnels is to allow the network devices to make routing decisions for traffic flow during the IP session. Additionally, when the MME provides the request to establish the IP session to the ILA node, the MME can include a tunnel endpoint identifier for the MME in the request, which can allow the MME be used as an endpoint for the first tunnel, as described herein.

As shown by reference number 106, the ILA node can allocate an IP version 6 (IPv6) address to the user device and can allocate a set of tunnel endpoint identifiers for the ILA node. For example, the ILA node can allocate an IPv6 address that includes a 64-bit prefix and a 64-bit suffix. In this case, the 64-bit prefix can be a location identifier associated with a geographic area of the user device, and the 64-bit suffix can be a unique device identifier for the user device. Additionally, the set of tunnel endpoint identifiers can include a tunnel endpoint identifier for the ILA node that is to be used as an endpoint for the first tunnel, and a tunnel endpoint identifier for the ILA node that is to be used as an endpoint for the second tunnel. To allocate the IPv6 address and the set of tunnel endpoint identifiers, the ILA node can search a data structure that stores sets of 64-bit prefixes, sets of 64-bit suffixes, and sets of tunnel endpoint identifiers, as described in detail elsewhere herein.

As shown by reference number 108, the ILA node can update a data structure that is used to store information associated with the IP session. For example, the ILA node can provide the IPv6 address, the tunnel endpoint identifiers for the ILA node, and a device identifier for the ILA node to an ILA data source to be stored using the data structure. In this case, the data structure can be used to associate the IPv6 address with the tunnel endpoint identifiers for the first and second tunnels and with the identifier for the ILA node. As shown by reference number 110, the ILA node can provide, to the MME, a response indicating to establish the IP session.

In this way, the ILA node can receive a request to establish the IP session, and can allocate an IPv6 address and a set of tunnel endpoint identifiers that can be used to help route traffic flow during the IP session, as described herein.

Figure 1B:
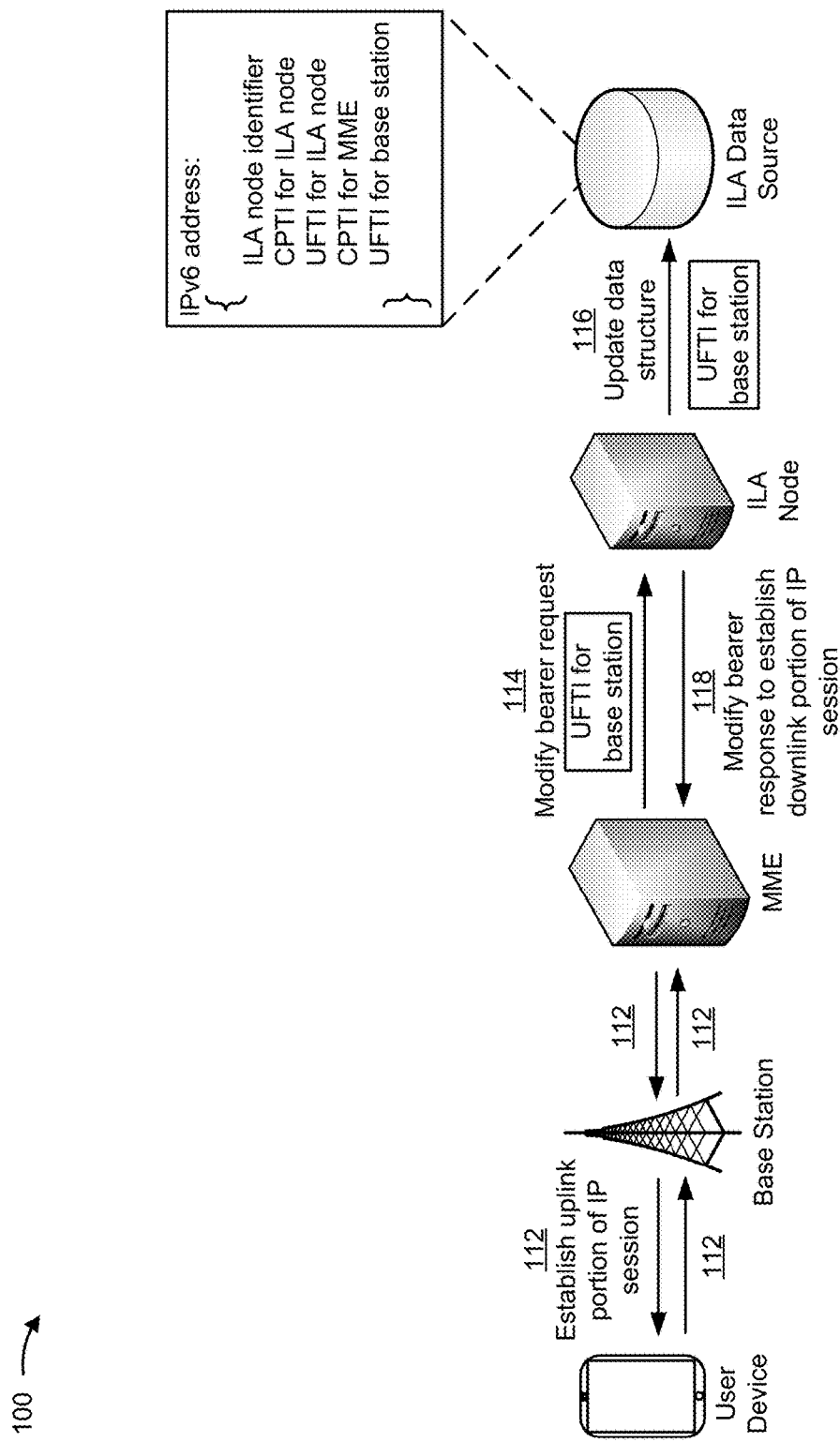

As shown in FIG. 1B, and by reference number 112, the MME can establish an uplink portion of the IP session. For example, the MME can interact with the base station and the user device to establish the connection, thereby allowing uplink data to be sent from the user device to another device (e.g., another user device, a server device, etc.). Additionally, while establishing the uplink portion of the IP session, the MME can provide, to the base station, the tunnel endpoint identifier for the ILA node for the second tunnel (e.g., the user forwarding tunnel). In this way, the base station can use the tunnel endpoint identifier for the ILA node as a destination for routing traffic during the IP session.

In some implementations, the MME and the ILA node can establish a downlink portion of the IP session. For example, as shown by reference number 114, the MME can provide a request (e.g., a modify bearer request) to the ILA node, where the request is sent via the first tunnel. The request can include the tunnel endpoint identifier for the base station.

As shown by reference number 116, the ILA node can update the data structure with the tunnel endpoint identifier for the base station (i.e., for the second tunnel). For example, the ILA node can update the data structure such that the tunnel endpoint identifier for the base station is associated with the IPv6 address of the user device. As shown by reference number 118, the ILA node can provide a response (e.g., a modify bearer response) to the MME indicating to establish the downlink portion of the IP session.

In this way, when the ILA node receives downlink traffic, the ILA node can, using the tunnel endpoint identifier for the base station, provide the downlink traffic to the base station via the second tunnel.

Figure 1C:
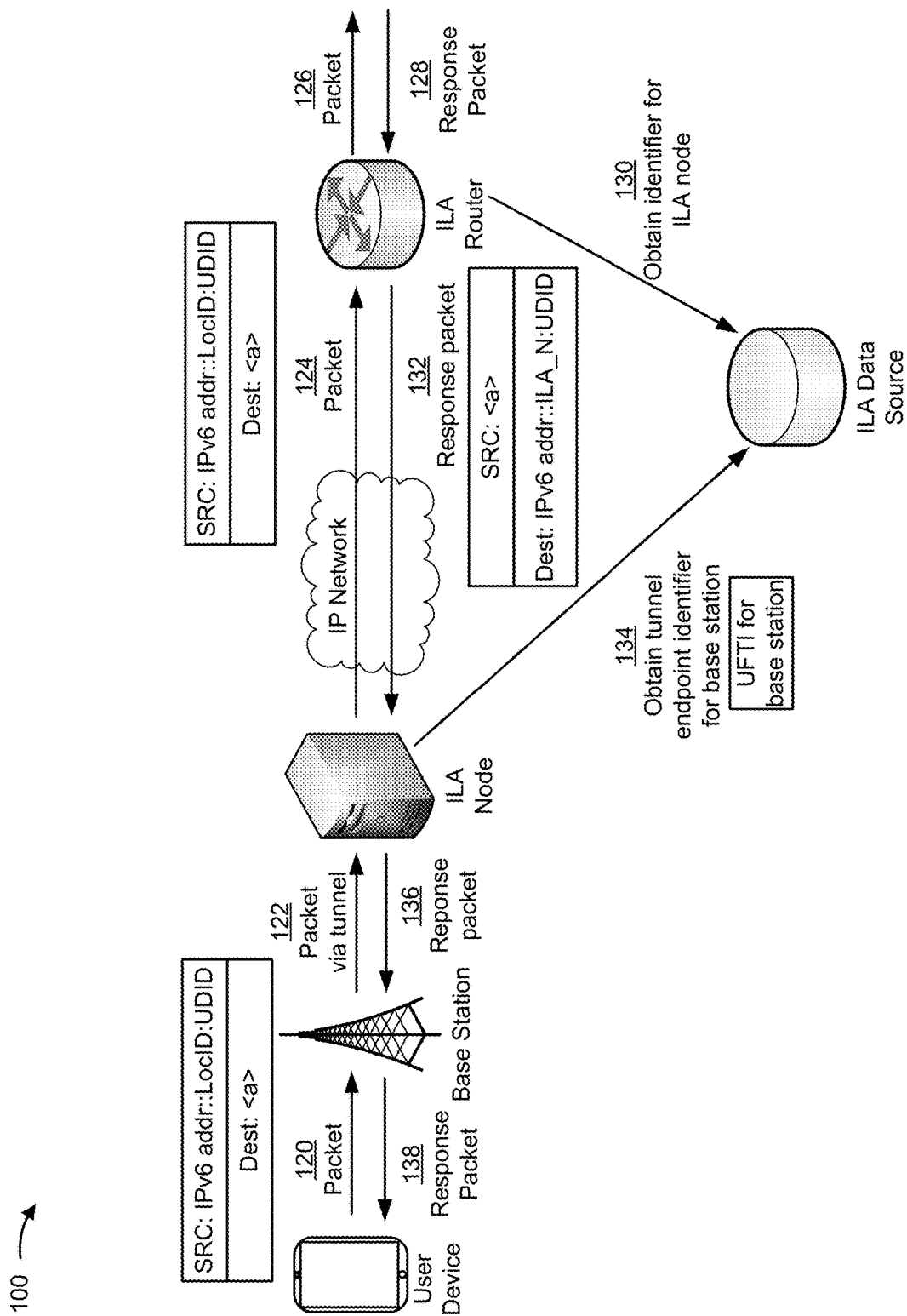

As shown in FIG. 1C, and by reference number 120, the user device can provide a packet associated with the IP session to the base station. For example, the user device can launch a service (e.g., a social media application) to provide a packet to the base station as part of the IP session. In this case, the packet can include the IPv6 address as a source address (shown as "SRC: IPv6addr::LocID:UDID") and an IPv6 address of a server device that hosts the service as a destination address (shown as "Dest: <a>"). As shown by reference number 122, the base station can provide the packet to the ILA node via the second tunnel. For example, the base station can encapsulate the packet using a tunneling protocol associated with the second tunnel, and can provide the encapsulated packet to the ILA node.

As shown by reference number 124, the ILA node can decapsulate the packet, and provide the packet through an IP network to an ILA router. For example, the ILA node can provide the packet to an ILA router that is identified based on the 64-bit prefix included in the IPv6 address (e.g., which is associated with a particular geographic location). In this case, network traffic within a geographic region can be supported by a set of ILA routers, and the ILA node can provide the packet to the ILA router that is associated with the particular geographic location.

As shown by reference number 126, the ILA router can provide the packet to another device (e.g., a server device that supports the service). As shown by reference number 128, the ILA router can receive a response packet from the other device.

As shown by reference number 130, the ILA router can obtain the identifier for the ILA node. For example, the response packet can store an IPv6 address of the server device as the source address and the IPv6 address of the user device as the destination address, but would not include the identifier of the ILA node, which can be needed if the response packet is traveling through the IP network. In this case, the ILA router can obtain the identifier for the ILA node by using the IPv6 address of the user device to search (e.g., query) the data structure that associates the IPv6 address with the identifier of the ILA node.

As shown by reference number 132, the ILA router can use the identifier for the ILA node to provide the response packet to the ILA node via the IP network. The IP network can include one or more devices that are only able to route the response packet to the ILA node if the identifier of the ILA node is included in the IPv6 destination address that is stored within the response packet. In this case, the ILA router can replace the 64-bit prefix of the IPv6 address (i.e., the location identifier of the user device) with the identifier of the ILA node, thereby providing the one or more devices associated with the IP network with a way to provide the response packet to the ILA node.

As shown by reference number 134, the ILA node can obtain the tunnel endpoint identifier for the base station for the second tunnel. For example, the ILA node can obtain the tunnel endpoint identifier for the base station by using the IPv6 address of the user device to query the data structure that associates the IPv6 address with the tunnel endpoint identifier for the base station for the second tunnel.

In some implementations, the ILA router and/or the ILA node can obtain information associated with the IP session from local memory (e.g., cache memory), rather than querying the ILA data source. For example, the ILA router and/or the ILA node can store identifiers (e.g., tunnel endpoint identifiers, device identifiers, etc.) in local memory, such that the ILA router and/or the ILA node can obtain the identifiers from the local memory, rather than needing to perform additional queries to the ILA data source. In this way, the ILA router and/or the ILA node conserve processing resources relative to repeatedly querying the ILA data source to obtain the tunnel endpoint identifiers. Furthermore, the ILA router and/or the ILA node can reduce signaling relative to a network architecture that uses the PGW and/or the SGW.

As shown by reference number 136, the ILA node can use the second tunnel to provide the response packet to the base station. As shown by reference number 138, the base station can provide the response packet to the user device.

In this way, the ILA node and/or the ILA router are able to use ILA as a stateless way to support traffic flow for the IP session.

Figure 1D:
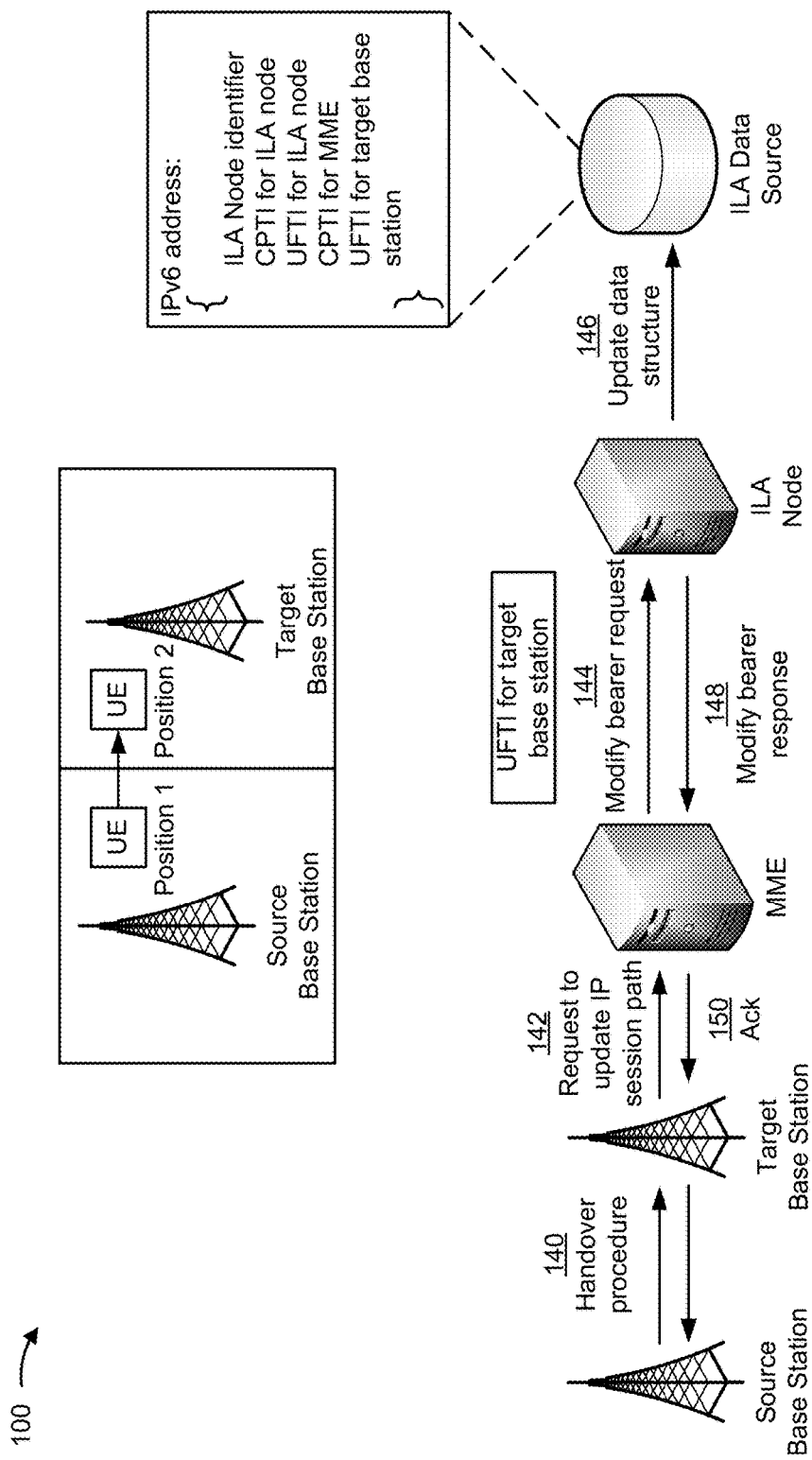

As shown in FIG. 1D, the user device can be mobile, and can travel to a location serviced by a different base station. For example, the user device can travel from a first position associated with a source base station to a second position associated with a target base station. As shown by reference number 140, when the user device enters a location serviced by the target base station, the source base station and the target base station can engage in a handover procedure.

As shown by reference number 142, the target base station can provide a request to the MME to update a path associated with the IP session, such that traffic flow travels to the target base station instead of to the source base station. As shown by reference number 144, the MME can provide a request (e.g., a modify bearer request) to the ILA node. The request can include the tunnel endpoint identifier for the target base station. As shown by reference number 146, the ILA node can update the data structure such that the tunnel endpoint identifier for the target base station is associated with the IPv6 address of the user device. In this case, the tunnel endpoint identifier for the target base station can replace the tunnel endpoint identifier for the source base station.

As shown by reference number 148, the ILA node can provide a response (e.g., a modify bearer response) to the MME indicating that the target base station is able to receive traffic flow associated with the IP session. As shown by reference number 150, the MME can provide an acknowledgement to the target base station indicating that the handover is complete.

In this way, the ILA node and the MME are able to use ILA to perform handovers during the IP session.

Figure 1E:
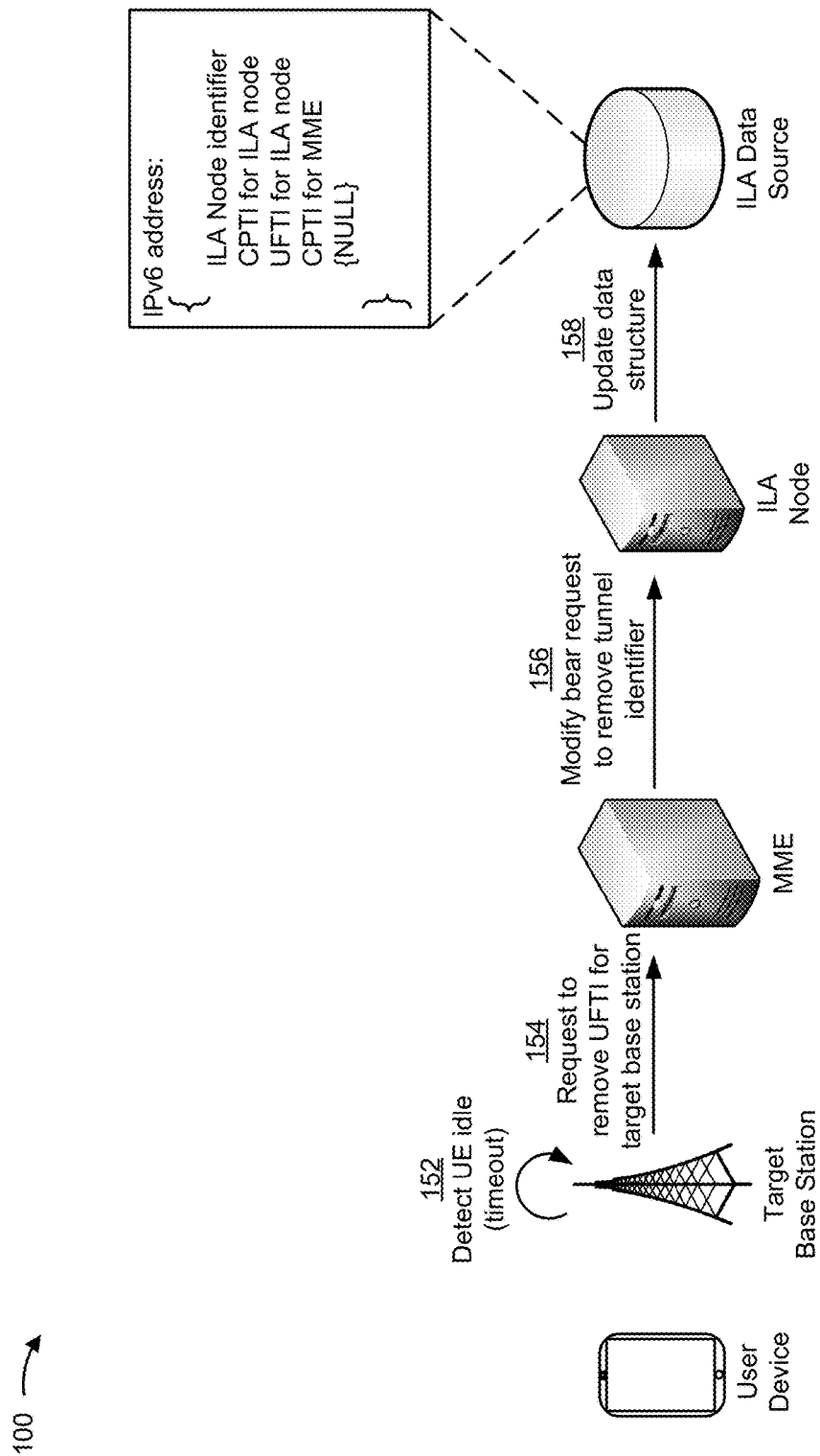

As shown in FIG. 1E, and by reference number 152, the target base station can detect that the user device is idle. For example, a user might not interact with the user device for a threshold time period, which can cause the target base station to detect that the user device is idle. As shown by reference number 154, the target base station can provide a request, to the MME, to remove the tunnel endpoint identifier for the target base station (i.e., for the second tunnel).

As shown by reference number 156, the MME can provide a request (e.g., a modify bearer request) to the ILA node to remove the tunnel endpoint identifier for the target base station for the second tunnel. As shown by reference number 158, the ILA node can update the data structure by removing the tunnel endpoint identifier for the target base station (shown in the data structure as a "NULL" field).

In this way, the ILA node and the MME are efficiently and effectively manage the IP session by removing tunnels associated with inactive IP sessions, thereby conserving processing resources and/or network resources.

Figure 1F:
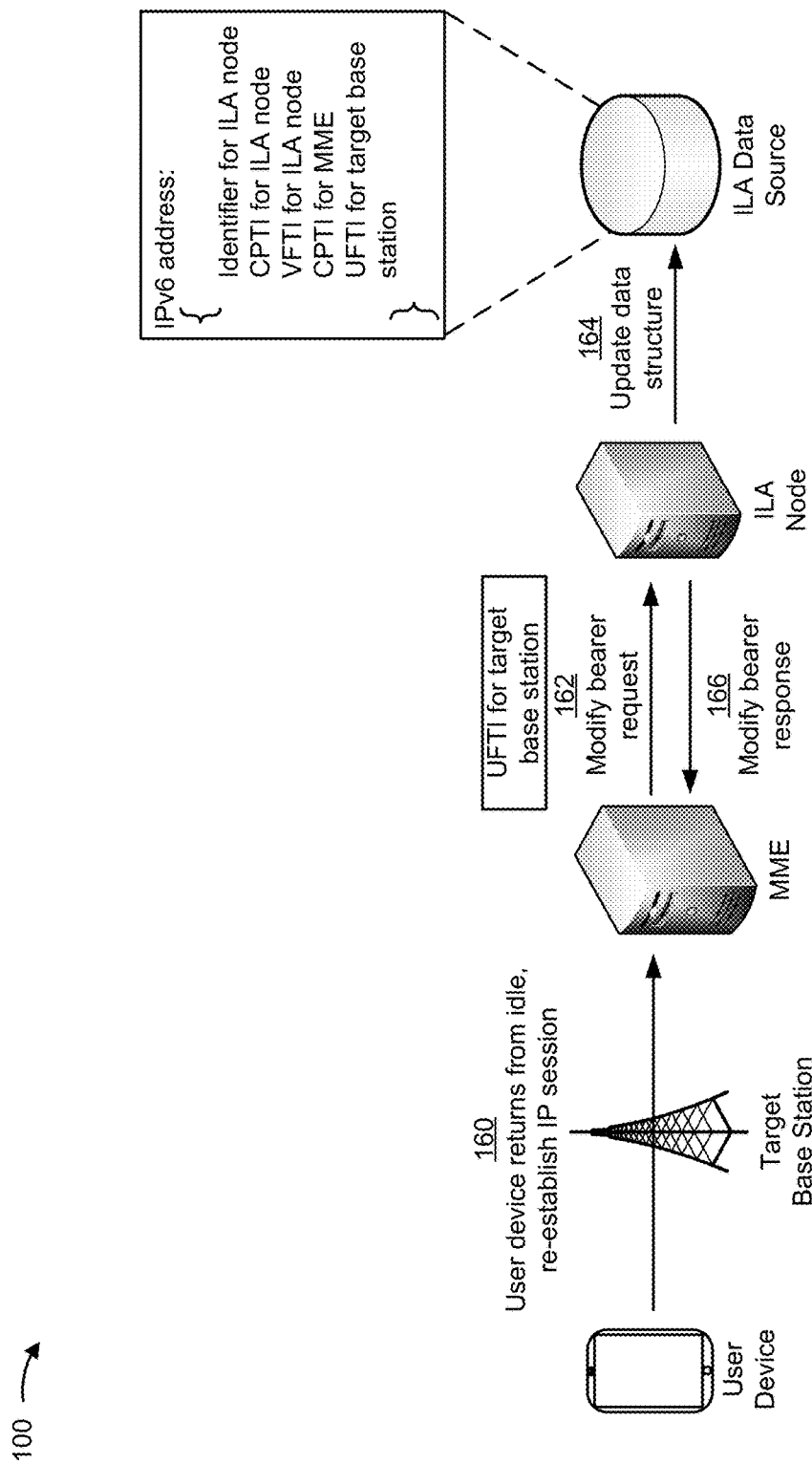

As shown in FIG. 1F, and by reference number 160, the user device can return from idle, causing the target base station to provide a request to the MME to re-establish the IP session. As shown by reference number 162, the MME can provide a request (e.g., a modify bearer request) to the ILA node that includes the tunnel endpoint identifier of the target base station.

As shown by reference number 164, the ILA node can update the data structure such that the IPv6 address of the user device is associated with the tunnel endpoint identifier of the target base station. As shown by reference number 166, the ILA node can provide a response (e.g., a modify bearer response) to the MME to allow the MME to re-establish the IP session using the target base station.

In this way, the ILA node and the MME are able to efficiently and effectively manage the IP session by re-establishing the IP session when the user device returns from an idle state.

As indicated above, FIGS. 1A-1F are provided merely as an example. Other examples are possible and can differ from what was described with regard to FIGS. 1A-1F. For example, there can be additional devices, fewer devices, different devices, or differently arranged devices than those shown in FIGS. 1A-1F. Furthermore, two or more devices shown in FIGS. 1A-1F can be implemented within a single device, or a single device shown in FIGS. 1A-1F can be implemented as multiple, distributed devices. Additionally, or alternatively, a set of devices (e.g., one or more devices) of environment 100 can perform one or more functions described as being performed by another set of devices of environment 100.

Figure 2A:
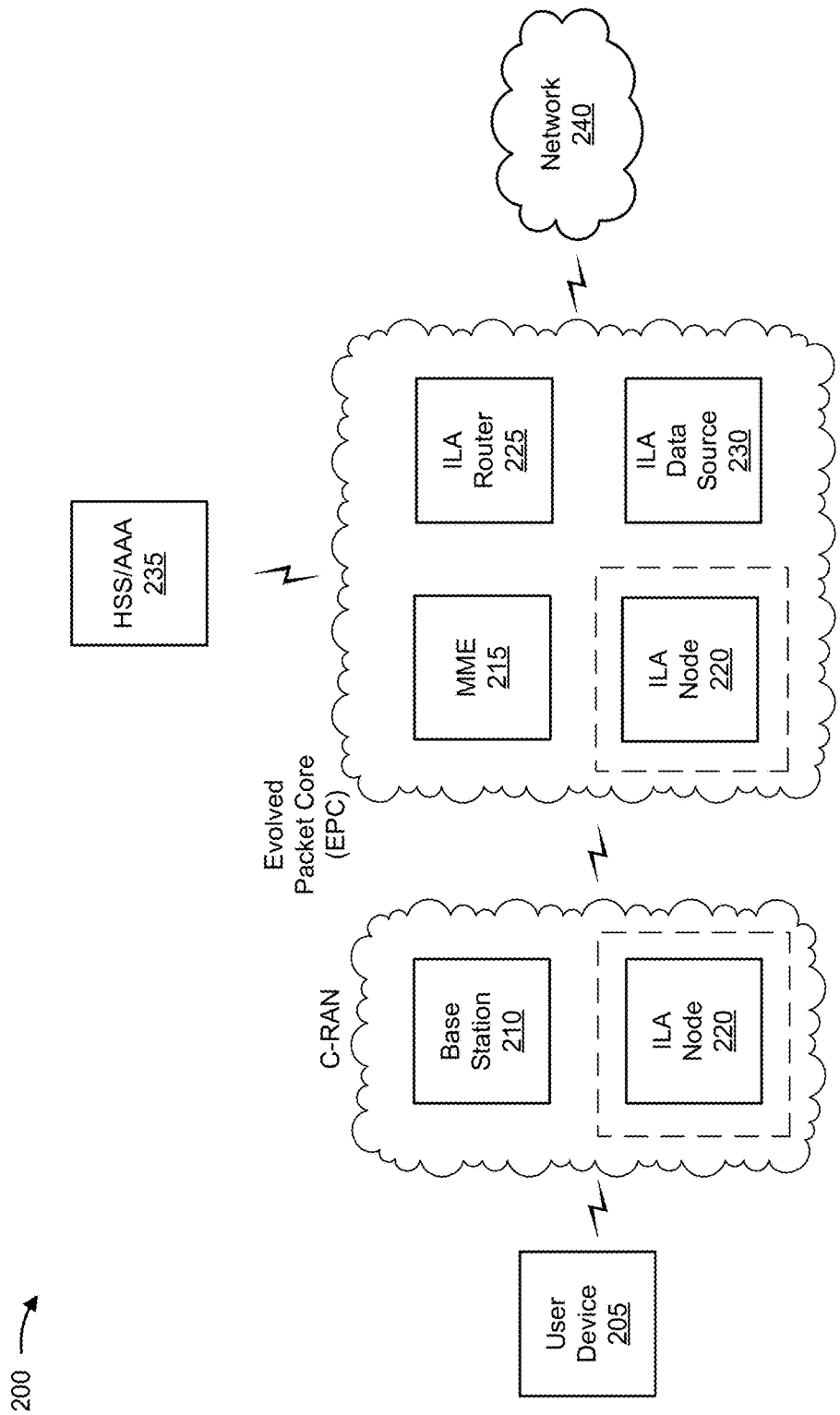
FIGS. 2A and 2B are diagrams of example environments in which systems and/or methods, described herein, can be implemented.
Figure 2B:
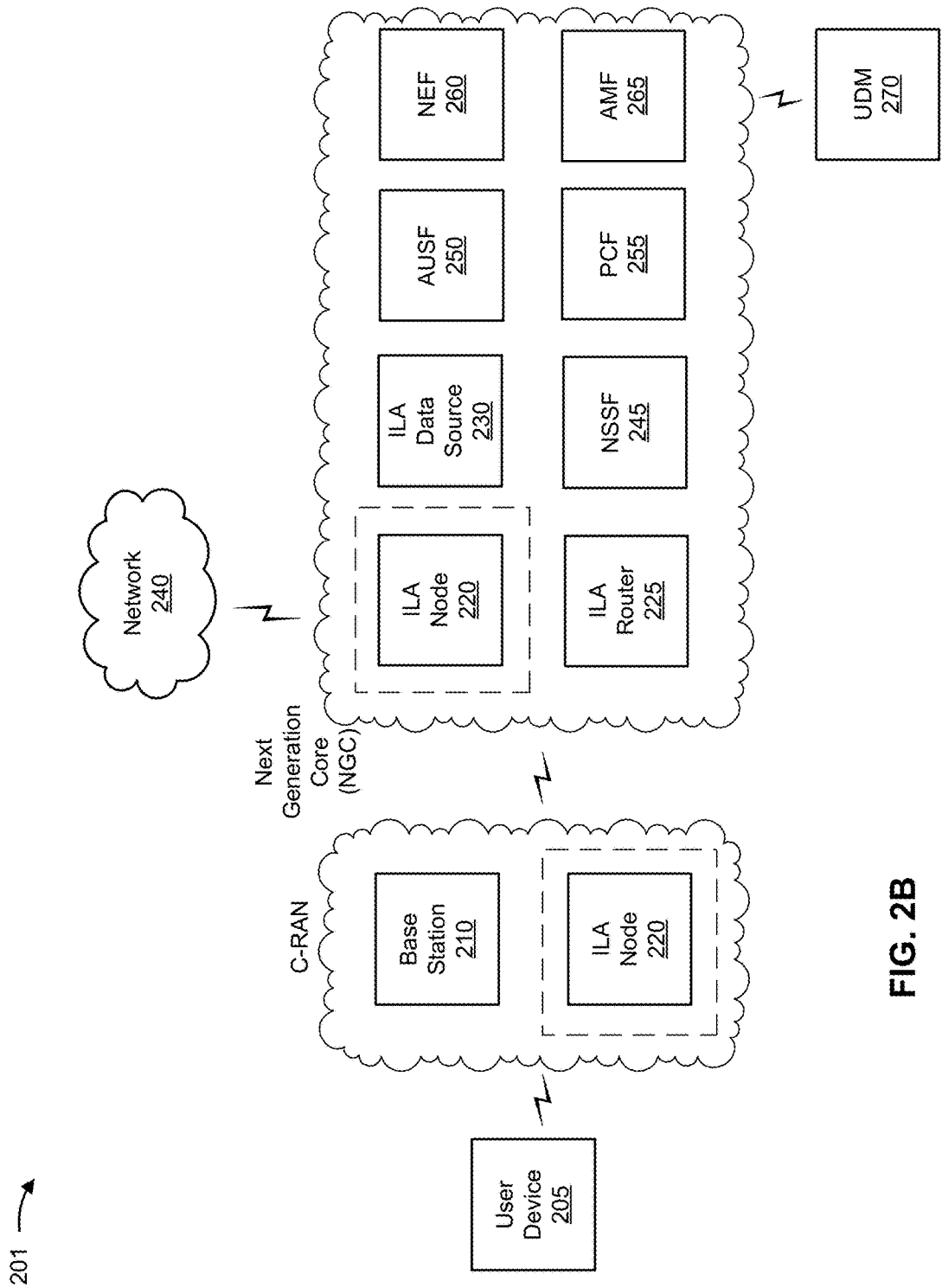

FIGS. 2A-2B are diagrams of example environments (example environment 200 and example environment 201) in which systems and/or methods, described herein, can be implemented. As shown in FIG. 2A, environment 200 can include a user device 205, a base station 210, a mobility management entity device (MME) 215, an ILA node 220, an ILA router 225, an ILA data source 230, a home subscriber server/authentication authorization and accounting server (HSS/AAA) 235, and/or a network 240. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a fifth generation (5G) network (shown in FIG. 2B), a third generation (3G) network, or the like.

Environment 200 can include an evolved packet system (EPS) that includes an LTE network and/or an evolved packet core (EPC) that operate based on a third generation partnership project (3GPP) wireless communication standard. The LTE network can include a cloud radio access network (C-RAN) that includes one or more base stations 220 that take the form of evolved Node Bs (eNBs) via which user device 205 communicates with the EPC. In some cases, the C-RAN can include ILA node 220, or, functionality associated with ILA node 220 can be supported by base station 210. The EPC can include MME 215, ILA node 220, ILA router 225, and/or ILA data source 230 that enable user device 205 to communicate with network 240 and/or an Internet protocol (IP) multimedia subsystem (IMS) core. In some cases, HSS/AAA 235 can reside in an IMS core, and can manage device registration and authentication, session initiation, etc., associated with mobile devices 205. In other cases, HSS/AAA 235 can reside in the EPC.

User device 205 includes one or more devices capable of providing, storing, processing, and/or receiving packets associated with an IP session. For example, user device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. In some implementations, user device 205 can send traffic to and/or receive traffic from network 240 (e.g., via base station 210 and/or ILA node 220).

Base station 210 includes one or more devices capable of transferring traffic, such as audio, video, text, and/or other traffic, destined for and/or received from user device 205. In some implementations, base station 210 can include an eNB associated with the LTE network that receives traffic from and/or sends traffic to network 240 via ILA node 220 and/or ILA router 225. Additionally, or alternatively, one or more base stations 220 can be associated with a RAN (e.g., a C-RAN) that is not associated with the LTE network. Base station 210 can send traffic to and/or receive traffic from user device 205 via an air interface. In some implementations, base station 210 can include a small cell base station, such as a base station of a microcell, a picocell, and/or a femtocell. In some implementations, functionality associated with ILA node 220 can be supported by base station 210.

MME 215 includes one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular ILA node 220 and/or a particular ILA router 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

ILA node 220 includes one or more devices capable of receiving, storing, processing, generating, and/or providing information associated with an IP session. For example, ILA node 220 can include a computing device, such as a server device (e.g., a host server, a web server, an application server, etc.), a data center device, or a similar device. In some implementations, ILA node 220 can be hosted within the EPC. In some implementations, ILA node 220 can be hosted within a RAN, such as a C-RAN.

In some implementations, ILA node 220 can receive, from MME 215, a request to establish an IP session. In some implementations, ILA node 220 can update a data structure hosted by ILA data source 230. In some implementations, ILA node 220 can provide a response to MME 215 indicating to establish the IP session.

In some implementations, ILA node 220 can receive a request from MME 215 (e.g., a modify bearer request) associated with modifying a tunnel used for an IP session. In some implementations, ILA node 220 can provide a response (e.g., a modify bearer response) indicating an action in response to the request. In some implementations, ILA node 220 can provide traffic to and/or receive traffic from base station 210 and/or ILA router 225.

In some implementations, ILA node 220 can be an endpoint for a first tunnel (e.g., a control plane tunnel) and a second tunnel (e.g., a user forwarding tunnel) associated with an IP session. In some implementations, ILA node 220 can be an endpoint for the second tunnel, and the endpoint for the first tunnel can be ILA router 225.

ILA router 225 includes one or more devices capable of receiving, storing, processing, generating, and/or providing information associated with an IP session. For example, ILA router 225 can include one or more data processing and/or traffic transfer devices, such as a gateway, a router, a modem, a switch, a firewall, a NIC, a hub, a bridge, a server device, or any other type of routing device that processes and/or transfers traffic. In some implementations, ILA router 225 can be hosted in the EPC. In some implementations, ILA router 225 can obtain information associated with an IP session by interacting with ILA data source 230.

ILA data source 230 includes one or more devices capable of receiving, storing, processing, generating, and/or providing information associated with an IP session. For example, ILA data source 230 can include a server device or a group of server devices.

HSS/AAA 235 includes one or more devices, such as one or more server devices, capable of managing (e.g., receiving, generating, storing, processing, and/or providing) information associated with user device 205. For example, HSS/AAA 235 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), information that identifies whether user device 205 is associated with an RF access signaling usage control policy and/or an RF access signaling usage billing policy, and/or similar information. HSS/AAA 235 may provide this information to one or more other devices of environment 200 to support the operations performed by those devices.

Additionally, or alternatively, HSS/AAA 235 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, RF access signaling usage restrictions, etc.), may track resources consumed by user device 205 (e.g., a quantity of voice minutes consumed, a quantity of data consumed, a quantity of RF signals transmitted, a quantity of radio access bearers requested and/or established, etc.), and/or may perform similar operations.

Network 240 includes one or more wired and/or wireless networks. For example, network 240 can include a cellular network (e.g., a 5G network, a 4G network, such as a LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

As shown in FIG. 2B, environment 201 can include a user device 205, a base station 210, an ILA node 220, an ILA router 225, an ILA data source 230, a network 240, a network slice selection function (NSSF) 245, an authentication server function (AUSF) 250, a policy control function (PCF) 255, a network exposure function (NEF) 260, an access and mobility management function (AMF) 265, and/or a unified data management (UDM) server 270. Devices of environment 201 can interconnect via wired connections, wireless connections, or a combination of wired and wireless connections.

Example environment 201 can include a next generation core (NGC) that operates based on a third generation partnership project (3GPP) wireless communication standard. Additionally, environment 201 can include the C-RAN that includes the one or more base stations 220 via which user device 205 communicates with the NGC. The NGC can include ILA node 220, ILA router 225, ILA data source 230, NSSF 245, AUSF 250, PCF 255, AMF 260, and/or NEF 265.

In some implementations, one or more devices and/or functions of example environment 201 can support control plane functionality or user plane functionality, such that the control plane functionality is supported by different devices or functions than that which support the user plane functionality. In some implementations, one or more devices and/or functions of example environment 201 can invoke network services via one or more application programming interfaces (APIs). In some implementations, one or more devices and/or functions of example environment 201 can communicate via protocols, such as a diameter protocol, a control plane protocol, a user plane protocol, and/or the like. Devices and/or functions not described in FIG. 2A are described below.

NSSF 245 includes one or more devices capable of selecting network slice instances. For example, NSSF 245 can include a server device or a group of server devices.

AUSF 250 includes one or more devices capable of performing authentication procedures between UE 205 and devices associated with the NGC. For example, AUSF 250 can include a server device or a group of server devices. In some implementations, AUSF 250 can support application influence on traffic routing, accessing NEF 265, interactions with PCF 255, and/or the like.

PCF 255 includes one or more devices capable of supporting, managing, updating, receiving, and/or providing one or more network policies and rules. For example, PCF 255 can include a server device or a group of server devices.

NEF 260 includes one or more devices capable of providing secure exposure to services and/or capabilities provided by one or more network devices and/or functions described herein. For example, PCF 255 can include a server device or a group of server devices.

AMF 265 includes one or more devices capable of managing authentication, activation, deactivation, and/or mobility functions associated with user device 205. For example, AMF 265 can include a server device or a group of server devices. In some cases, AMF 265 can perform one or more functions described by MME 215.

UDM 270 includes one or more devices capable of managing (e.g., receiving, generating, storing, processing, and/or providing) information associated with user device 205. For example, UDM 270 can include a server device or a group of server devices. In some cases, UDM 270 can perform one or more functions described by HSS/AAA 235.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
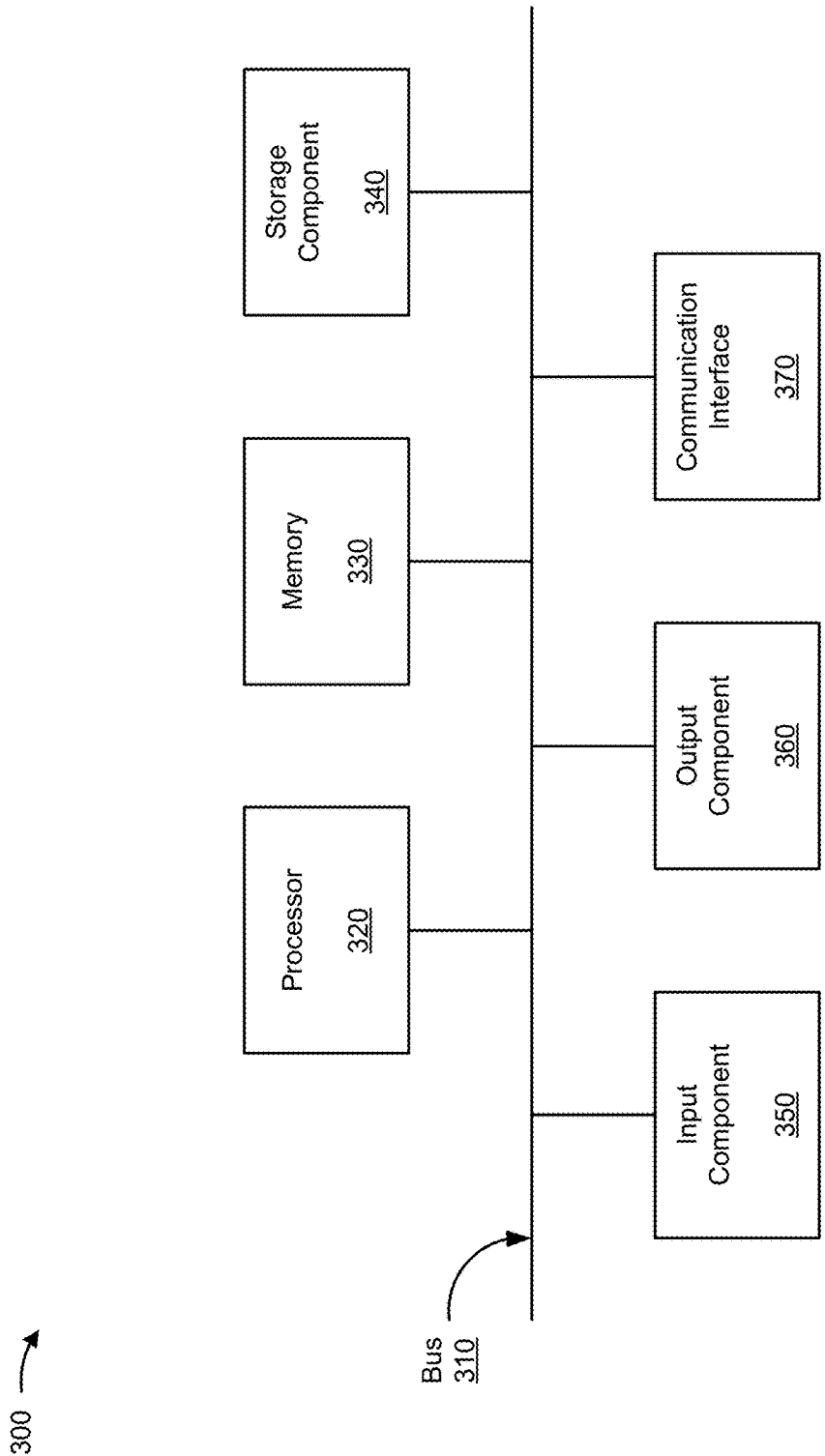
FIG. 3 is a diagram of example components of one or more devices of FIG. 2.

FIG. 3 is a diagram of example components of a device 300. Device 300 can correspond to user device 205, base station 210, MME 215, ILA node 220, ILA router 225, ILA data source 230, HSS/AAA 235, NSSF 245, AUSF 250, PCF 255, NEF 260, AMF 265, and/or UDM 270. In some implementations, user device 205, base station 210, MME 215, ILA node 220, ILA router 225, ILA data source 230, HSS/AAA 235, NSSF 245, AUSF 250, PCF 255, NEF 260, AMF 265, and/or UDM 270 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

Some of the implementations described herein may be virtualized. For example, one or more devices and/or components may be supported by cloud resources, such as one or more applications, one or more virtual machines, one or more virtualized storage techniques (e.g., block virtualization, file virtualization, etc.), one or more hypervisors, and/or the like.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
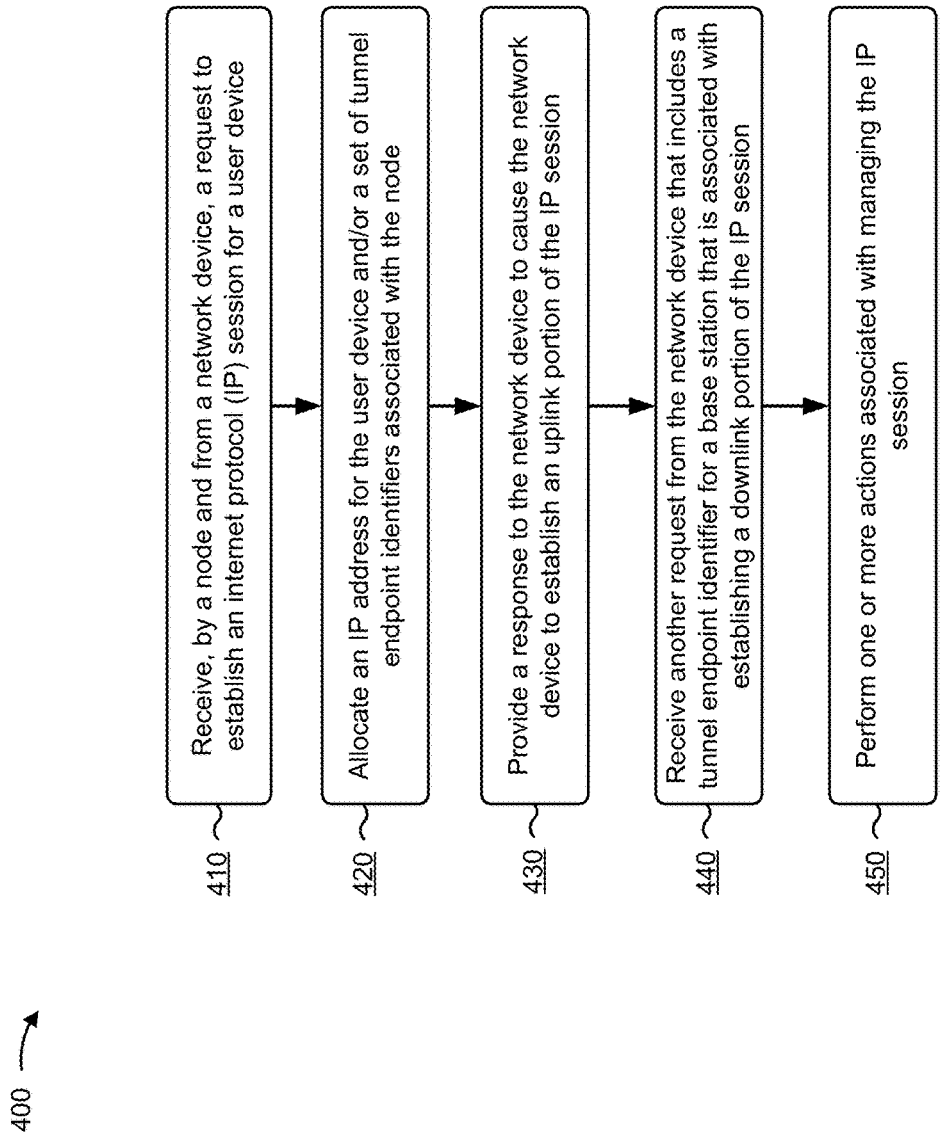
FIG. 4 is a flow chart of an example process for using ILA to support an internet protocol (IP) session for a user device.

FIG. 4 is a flow chart of an example process 400 for using ILA to support an internet protocol (IP) session for a user device. In some implementations, one or more process blocks of FIG. 4 can be performed by ILA node 220. In some implementations, one or more process blocks of FIG. 4 can be performed by another device or a group of devices separate from or including ILA node 220, such as user device 205, base station 210, MME 215, ILA router 225, ILA data source 230, HSS/AAA 235, NSSF 245, AUSF 250, PCF 255, NEF 260, AMF 265, and/or UDM 270.

As shown in FIG. 4, process 400 can include receiving, by a node and from a network device, a request to establish an internet protocol (IP) session for a user device (block 410). For example, an ILA node 220, of a set of ILA nodes 240, can receive, from MME 215, a request to establish an IP session for user device 205. The request can include a tunnel endpoint identifier for a first tunnel (e.g., a control plane tunnel). To enable network devices to send and/or receive traffic flow associated with the IP session, tunnels can be established between network devices, such as the first tunnel, which can be established between MME 215 and ILA node 220. Additionally, a second tunnel (e.g., a user forwarding tunnel) can be established between base station 210 and ILA node 220, as described herein.

In some implementations, one or more devices associated with network 240 can establish tunnels to manage traffic flow for the IP session. For example, a first network device and a second network device can establish a tunnel (e.g., via a tunneling protocol, such as general packet radio service tunneling protocol) between each other, where the first and the second network device are endpoints of the tunnel and can be identified using tunnel endpoint identifiers. As an example, if tunnel endpoint identifiers are shared between network devices, traffic flow for the IP session (e.g., incoming traffic, outgoing traffic, etc.) can travel through the tunnel if a network device at a first endpoint of the tunnel has access to a tunnel endpoint identifier of a network device at a second endpoint of the tunnel.

In some implementations, prior to ILA node 220 receiving the request to establish the IP session, user device 205 can interact with one or more network devices to request to connect to network 240. For example, user device 205 can provide a radio resource control (RRC) connection setup request to base station 210, which can cause base station 210 to provide a connection request to MME 215. In this case, MME 215 can communicate with HSS/AAA 235 to perform an authentication procedure (e.g., to verify user device 205).

In some implementations, MME 215 can generate the request to establish the IP session. For example, MME 215 can generate a request to establish the IP session that includes a tunnel endpoint identifier for MME 215 that is for the first tunnel.

Additionally, MME 215 can select ILA node 220 as a destination for the request to establish the IP session. For example, ILA node 220 can be one of a set of ILA nodes 240 that collectively support IP sessions in a geographic region. In this case, MME 215 can select ILA node 220 based on geographic location information of user device 205. For example, each ILA node 220, of the set of ILA nodes 240 can be assigned to a particular geographic area within the geographic region, and MME 215 can use the geographic location information of user device 205 (e.g., obtained via a tracking area indicator (TAI) included in the initial request) to select ILA node 220 as the destination for the request to establish the IP session.

In this way, ILA node 220 is able to receive a request to establish the IP session.

As further shown in FIG. 4, process 400 can include allocating an IP address for the user device and/or a set of tunnel endpoint identifiers associated with the node (block 420). For example, ILA node 220 can allocate an IP address (e.g., an IP version 6 (IPv6) address) to user device 205 and/or a set of tunnel endpoint identifiers for ILA node 220, such as a tunnel endpoint identifier associated with the first tunnel (e.g., the control plane tunnel) that is to be used during the IP session, a tunnel endpoint identifier associated with the second tunnel (e.g., the user forwarding tunnel) that is to be used during the IP session, and/or the like.

In some implementations, ILA node 220 can allocate an IPv6 address to user device 205. For example, ILA node 220 can allocate an IPv6 address that includes a 64-bit prefix and a 64-bit suffix. In this case, the 64-bit prefix can be a location identifier associated with a geographic area of user device 205, and the 64-bit suffix can be a unique device identifier for user device 205.

In some implementations, ILA node 220 can allocate an IPv6 address by selecting a 64-bit prefix (a first set of bits) and a 64-bit suffix (a second set of bits) from a data structure. For example, a data structure can be used to store a set of 64-bit prefixes, where each 64-bit prefix is associated with a different geographic area, and ILA node 220 can allocate a 64-bit prefix to user device 205 by selecting the 64-bit prefix from the data structure that is associated with the geographic area of user device 205. Additionally, the data structure can be used to store a set of 64-bit suffixes, and ILA node 220 can allocate a 64-bit suffix to user device 205 by selecting an available 64-bit suffix from the data structure. In this way, ILA node 220 can allocate an IPv6 address to the user device 205 that includes both a location identifier and a unique device identifier.

In some implementations, ILA node 220 can allocate a set of tunnel endpoint identifiers to use during the IP session. For example, ILA node 220 can allocate a tunnel endpoint identifier for the first tunnel and can allocate a tunnel endpoint identifier for the second tunnel. In this case, the tunnel endpoint identifiers can be preconfigured and stored using a data structure, and can be allocated for the IP session based on receiving the request from MME 215.

In some implementations, ILA node 220 can provide the IPv6 address and/or the set of tunnel endpoint identifiers to an ILA data source 230. For example, ILA node 220 can provide the IPv6 address and/or the set of tunnel endpoint identifiers to a data structure associated with ILA data source 230, such as a database (e.g., a relational database), a tree, a graph, a flat file, or the like.

In some implementations, ILA node 220 can provide the IPv6 address and/or the set of tunnel endpoint identifiers to an ILA data source 230 based on the location identifier included in the IPv6 address. For example, ILA data source 230 can be one of a set of ILA data sources 260 that are located throughout a geographic region, and ILA node 220 can use the location identifier included in the IPv6 address to select an ILA data source 230 that is associated with the same geographic area. By providing the IPv6 address and/or the set of tunnel endpoint identifiers to an ILA data source 230, additional network devices (e.g., ILA router 225, another ILA node 220, etc.) can access the IPv6 address and/or the set of tunnel endpoint identifiers, even if the ILA node 220 crashes or loses a connection to network 240.

In this way, ILA node 220 is able to allocate an IP address to user device 205 and/or allocate a set of tunnel endpoint identifiers for the IP session.

As further shown in FIG. 4, process 400 can include providing a response to the network device to cause the network device to establish an uplink portion of the IP session (block 430). For example, ILA node 220 can provide, to MME 215, a response (e.g., a create session response) that includes the IP address and/or the set of tunnel endpoint identifiers and that causes MME 215 to establish an uplink portion of the IP session.

In some implementations, MME 215 can communicate with base station 210 and/or user device 205 to establish the uplink portion of the IP session. For example, MME 215 can provide an initial context setup request to base station 210. The initial context setup request can include the IPv6 address and the tunnel endpoint identifier for ILA node 220 that is associated with the second tunnel. In this way, base station 210 is able to use ILA node 220 as an endpoint for the second tunnel when providing traffic associated with the IP session.

In this way, an uplink IP session can be established between user device 205 and a destination device.

As further shown in FIG. 4, process 400 can include receiving another request from the network device that includes a tunnel endpoint identifier for a base station that is associated with establishing a downlink portion of the IP session (block 440). For example, ILA node 220 can receive, from MME 215, another request (e.g., a modify bearer request) that includes a tunnel endpoint identifier for base station 210. The tunnel endpoint identifier for base station 210 can be used by one or more downstream network devices (e.g., MME 215, ILA node 220, ILA router 225, etc.) for routing traffic during the IP session to base station 210. Additionally, the request can be sent via the first tunnel (e.g., the control plane tunnel).

In some implementations, ILA node 220 can provide the tunnel endpoint identifier for base station 210 to ILA data source 230. For example, ILA node 220 can provide the tunnel endpoint identifier to ILA data source 230, such that ILA data source 230 can store an association between the IPv6 address of user device 205 and the tunnel endpoint identifier for base station 210. In this case, the tunnel endpoint identifier for base station 210 can be stored with the identifier for ILA node 220 and the other tunnel endpoint identifiers associated with the IP session.

In some implementations, ILA node 220 can provide a response (e.g., a modify bearer response) to MME 215 to cause MME 215 to establish the downlink portion of the IP session. For example, ILA node 220 can provide a response indicating that the tunnel endpoint identifier for base station 210 has been stored such that the tunnel endpoint identifier is accessible by one or more downstream network devices.

In this way, ILA node 220 is able to orchestrate obtainment and storage of the IPv6 address of user device 205 and tunnel endpoint identifiers which can be used to making routing decisions during the IP session.

As further shown in FIG. 4, process 400 can include performing one or more actions associated with managing the IP session (block 450). For example, ILA node 220 can support (e.g., receive, store, process, provide, etc.) traffic flow originating from user device 205, support traffic flow originating from another device (e.g., another UE, a server device, etc.), support base station handovers as user device 205 travels between different geographic locations, add or modify tunnels based on triggers (e.g., remove a tunnel if user device 205 goes idle, re-establish a tunnel if user device 205 returns from idle ,etc.), select a different ILA node 220 to support the IP session, and/or the like.

In some implementations, ILA node 220 can support traffic flow for the IP session that originates from user device 205. For example, user device 205 can, during the IP session, provide a packet to another device (e.g., another UE, a server hosting a website, etc.). In this case, user device 205 can provide the packet to base station 210. The packet can include the IPv6 address of user device 205 and an IPv6 address of the other device. Additionally, base station 210 can encapsulate the packet, and provide the encapsulated packet to ILA node 220. For example, base station 210 can encapsulate the packet using a tunneling protocol associated with the second tunnel, and can provide the encapsulated packet to ILA node 220. In this case, base station 210 is able to identify the endpoint of the second tunnel as a result of receiving the ILA node 220 tunnel endpoint identifier while establishing the IP session.

Continuing with the example implementation, ILA node 220 can decapsulate the packet, and can provide the packet to an ILA router 225 (e.g., using an IP network as an intermediary). For example, ILA node 220 can provide the packet to an ILA router 225 based on the 64-bit prefix included in the IPv6 address (e.g., which is associated with a particular geographic area). In this case, network traffic within a geographic region can be supported by a set of ILA routers 250, and ILA node 220 can provide the packet to a particular ILA router 225 that is associated with the geographic are identified by the 64-bit prefix. In some cases, such as when the other device is another user device 205, ILA node 220 can replace the 64-bit prefix with an identifier of ILA node 220. This will allow devices within the IP network (which is between ILA node 220 and ILA router 225) to indicate to ILA router 225 that the packet came from ILA node 220. Without replacing the 64-bit prefix, ILA router 225 might see that the packet came from user device 205, but have no indication of which ILA node 220 sent the packet.

Continuing with the example implementation, ILA router 225 can receive another packet associated with the IP session from the other device. For example, ILA router 225 can receive another packet that includes the IPv6 address of the other device as the source address and the IPv6 address of user device 205 as the destination address. In this case, the packet might not include the identifier of ILA node 220, which can be needed if the response packet is traveling through the IP network. Additionally, ILA router 225 can obtain the identifier associated with ILA node 220 from ILA data source 230. For example, ILA router 225 can query ILA data source 230 using the IPv6 address of user device 205

(or by using the 64-bit suffix within the IPv6 address) to obtain the identifier for ILA node 220.

Continuing with the example implementation, ILA router 225 can use the identifier of ILA node 220 to provide the other packet to ILA node 220 (e.g., via the IP network). In this case, ILA router 225 can create a modified IPv6 address by replacing the 64-bit prefix of the IPv6 address of user device 205 with the identifier of the ILA node 220, and can provide the other packet that includes the modified IPv6 address to ILA node 220. In this way, ILA node 220 and/or ILA router 225 are able to use ILA to support traffic flow of the IP session via an IP network. Furthermore, ILA router 225 can store the identifier of ILA node 220 (e.g., using cache memory), thereby conserving processing resources and network resources by avoiding additional ILA data source 230 queries during the IP session.

Continuing with the example implementation, after ILA node 220 receives the other packet, ILA node 220 can obtain one or more tunnel endpoint identifiers for the IP session. For example, ILA node 220 can use the 64-bit suffix of the IPv6 address to query ILA data source 230 to obtain the tunnel endpoint identifier associated with base station 210. In this case, ILA node 220 can use the second tunnel (e.g., the user forwarding tunnel) to provide the other packet to base station 210, and base station 210 can provide the other packet to user device 205. Furthermore, ILA node 220 can store the IPv6 address of user device 205 and tunnel endpoint identifiers (e.g., using cache memory), thereby conserving processing resources and network resources by avoiding additional ILA data source 230 queries during the IP session.

In some implementations, ILA node 220 can receive a packet that did not originate from user device 205. For example, ILA node 220 can receive a packet from another device, such as another user device 205, a server device that uses the Internet to provide a service, or the like. In this case, the other device can provide, to ILA router 225, the packet that includes the source address (e.g., an IPv6 address for the other device) and the destination address (e.g., the IPv6 address of user device 205).

Continuing with the example implementation, ILA router 225 can use the IPv6 address of user device 205 to obtain the identifier of ILA node 220 from ILA data source 230. For example, ILA router 225 can use the 64-bit suffix of the IPv6 address of user device 205 to query ILA data source 230 to obtain the identifier of ILA node 220. Additionally, ILA router 225 can provide the packet to ILA node 220, and ILA node 220 can use the second tunnel (e.g., the user forwarding tunnel) to provide the packet to base station 210, which can provide the packet to user device 205, in the same manner described above.

In some implementations, user device 205 can be mobile during the IP session, and can travel to a location serviced by a different base station 210. For example, user device 205 can travel from a first position associated with a source base station 210 to a second position associated with a target base station 210. In this case, the source base station 210 and the target base station 210 can perform a handover procedure, which can cause the target base station 210 to provide a request to MME 215 to update the IP session path. Here, MME 215 can provide a request (e.g., a modify bearer request) to ILA node 220 to update the data structure by replacing the tunnel endpoint identifier associated with the source base station 210 with a tunnel endpoint identifier associated with the target base station 210.

Continuing with the example implementation, ILA node 220 can update the data structure associated with ILA data source 230. For example, ILA node 220 can update the data structure by replacing the identifier associated with source base station 210 with the identifier associated with target base station 210. Additionally, ILA node 220 can provide a response to MME 215 (e.g., a modify bearer response), which can cause MME 215 to provide an acknowledgement to target base station 210 to indicate that the tunnel endpoint identifier for the second tunnel has been updated.

Additionally, or alternatively, ILA node 220 can remove a tunnel based on a trigger. For example, ILA node 220 can remove a tunnel (e.g., a tunnel used to support uplink traffic flow) if user device 205 enters an idle state. In this case, ILA node 220 can receive a request (e.g., a release access bearer request) from MME 215, which can cause ILA node 220 to update the data structure associated with ILA data source 230. Here, ILA node 220 can remove the tunnel endpoint identifier associated with base station 210 (e.g., a value of null can be stored in place of the tunnel endpoint identifier). In this way, the tunnel between base station 210 and ILA node 220 can be removed, thereby freeing up network resources that can be used to service other IP sessions.

Additionally, or alternatively, ILA node 220 can add a tunnel based on a trigger activated by user device 205. For example, ILA node 220 can add a tunnel if user device 205 returns to an active state. For example, assume user device 205 enters an idle state which causes ILA node 220 to remove a tunnel between base station 210 and ILA node 220. In this case, if user device 205 enters into an active state, then MME 215 can provide a request (e.g., a modify bearer request) associated with an attachment procedure to ILA node 220 that includes a tunnel endpoint identifier for base station 210 (which can be used to re-establish the tunnel between base station 210 and ILA node 220). Additionally, ILA node 220 can update the data structure associated with ILA data source 230 to store the tunnel endpoint identifier for base station 210, thereby allowing the data structure to store tunnel endpoint identifiers for all (or some) endpoints needed to support traffic flow for the IP session.

Additionally, or alternatively, ILA node 220 can add a tunnel based on a trigger activated by another device. For example, assume user device 205 enters an idle state which causes ILA node 220 to remove a tunnel between base station 210 and ILA node 220. Further assume that user device 205 remains in the idle state, but receives a packet from another device (e.g., user device 205 can receive a call, an e-mail, a text message, etc.). In this case, the other device can first provide the packet to ILA router 225, and ILA router 225 can obtain the identifier of ILA node 220 from the data structure, in the same manner described elsewhere herein. Furthermore, ILA router 225 can replace the 64-bit prefix of the IPv6 address of user device 205 with the identifier of ILA node 220, and can provide the packet with the modified IPv6 address to ILA node 220.

Continuing with the example implementation, ILA node 220 can search the data structure for the tunnel endpoint identifier for base station 210. However, because user device 205 went idle, the search might return an empty value (e.g., a NULL value), indicating that base station 210 is not presently established as an endpoint of the second tunnel. In this case, ILA node 220 can provide a notification to MME 215, requesting to re-establish the second tunnel for the IP session. Additionally, MME 215 can interact with base station 210 and/or user device 205 to re-establish the second tunnel, in the same manner described elsewhere herein.

Additionally, or alternatively, another ILA node 220 and/or another ILA router 225 can support the IP session. For example, assume ILA node 220 and/or ILA router 225 lose power or crash. In this case, base station 210 might not receive acknowledgement packets associated with packets sent as part of the IP session. In this case, a timeout period might expire, which can cause base station 210 to provide a request associated with a timeout procedure to MME 215 to identify a new ILA node 220 to support the IP session.

Continuing with the example, MME 215 can select a new ILA node 220, in the same manner described elsewhere herein. In this case, an identifier of the new ILA node 220 can be stored using the data structure associated with ILA data source 230. Additionally, the identifier of the new ILA node 220 can be provided to base station 210, thereby allowing base station 210 to provide packets associated with the IP session to the new ILA node. In this way, the new ILA node 220 is able to seamlessly support the IP session, despite that the original ILA node 220 lost power or crashed.

In this way, ILA node 220 is able to perform one or more actions associated with managing the IP session.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
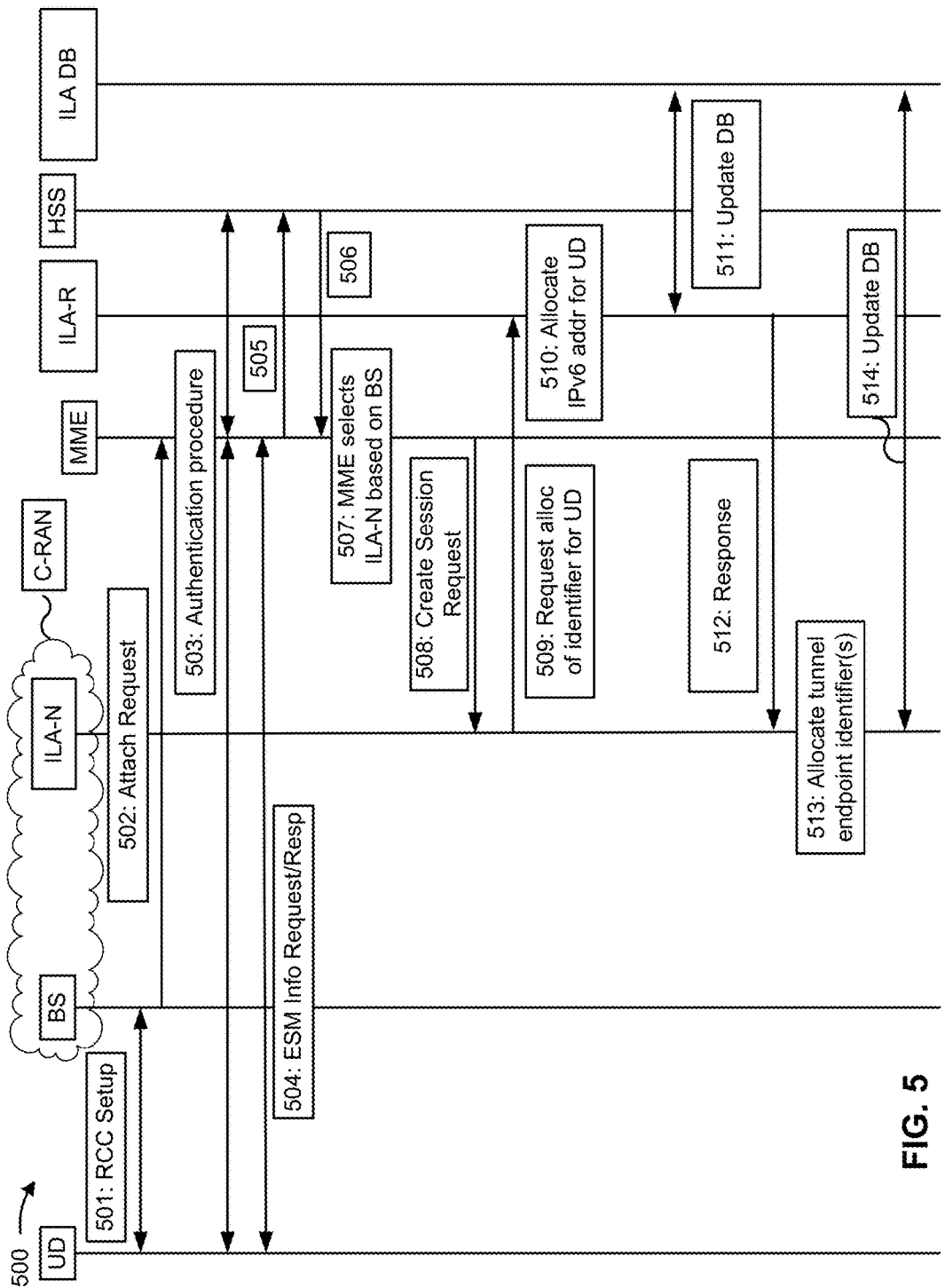
FIG. 5 is a diagram of an example implementation 500 for using ILA to establish an IP session, where an ILA node is hosted near a base station, rather than near a service access point (SAP)

FIG. 5 is a call flow diagram of an example implementation 500 for using ILA to establish an IP session, where an ILA node 220 is hosted near base station 210 (e.g., as part of a cloud radio access network (C-RAN)), rather than using an ILA node 220 that is hosted at a service access point (SAP).

As shown in FIG. 5, and by reference numbers 501-506, a user device can interact with one or more network devices (e.g., a base station, an ILA node 220, an MME 215, an ILA router 225, an HSS/AAA 235, etc.) to begin to establish an IP session (the details of which are described elsewhere herein).

As shown by reference number 507, MME 215 can select an ILA node 220 based on a base station 210 that receives the connection request from the user device. For example, assume a set of ILA nodes 240 and a set of base stations 220 collectively manage IP sessions in a geographic region (e.g., a country, a state, etc.). In this case, if an ILA node 220 corresponds to a base station 210 (e.g., a one to one mapping), then MME 215 can select a particular ILA node 220 based on the particular base station 210 that provides the connection request.

As shown by reference number 508, MME 215 can provide a request to establish the IP session to ILA node 220. The request can include a tunnel endpoint identifier for MME 215 for a first tunnel (e.g., a control plane tunnel) between MME 215 and ILA node 220, and a tunnel endpoint identifier for ILA node 220 for a second tunnel (e.g., another control plane tunnel) between ILA node 220 and ILA router 225.

As shown by reference number 509, ILA node 220 can request an IPv6 address from ILA router 225. For example, because ILA node 220 is hosted as part of the C-RAN, ILA router 225 can support the IP address allocation functionality. As shown by reference number 510, the ILA router 225 can allocate the IPv6 address, in a similar manner to that described elsewhere herein. As shown by reference number 511, ILA router 225 can update a data structure to associate the IPv6 address of user device 205 with the tunnel endpoint identifier of MME 215 and the tunnel endpoint identifier of ILA node 220.

As shown by reference number 512, ILA router 225 can provide a response to ILA node 220. For example, ILA router 225 can provide a response indicating that the IPv6 address for user device 205 has been allocated. As shown by reference number 513, receiving the response indicating that the IPv6 address of user device 205 has been allocated can cause ILA node 220 to allocate tunnel endpoint identifiers. For example, ILA node 220 can allocate a tunnel endpoint identifier of ILA node 220 for the first tunnel (e.g., the control plane tunnel between MME 215 and ILA router 225) and a tunnel endpoint identifier of ILA node 220 for a third tunnel (e.g., a user forwarding tunnel between base station 210 and ILA router 225).

As shown by reference number 514, ILA node 220 can update the data structure with the tunnel endpoint identifiers. For example, ILA node 220 can update the data structure to establish an association between the IPv6 address of user device 205 and the three tunnel endpoint identifiers described above. Additionally, while not shown, MME 215, ILA node 220 and/or ILA router 225 can interact to establish the IP session, in the same manner described elsewhere herein.

In this way, the ILA node 220 and the ILA router 225 can establish and support an IP session using ILA, when the ILA node 220 is hosted near base station 210 (e.g., as part of a C-RAN hub).

As indicated above, FIG. 5 is provided merely as an example. Other examples are possible and can differ from what was described with regard to FIG. 5.

Figure 6:
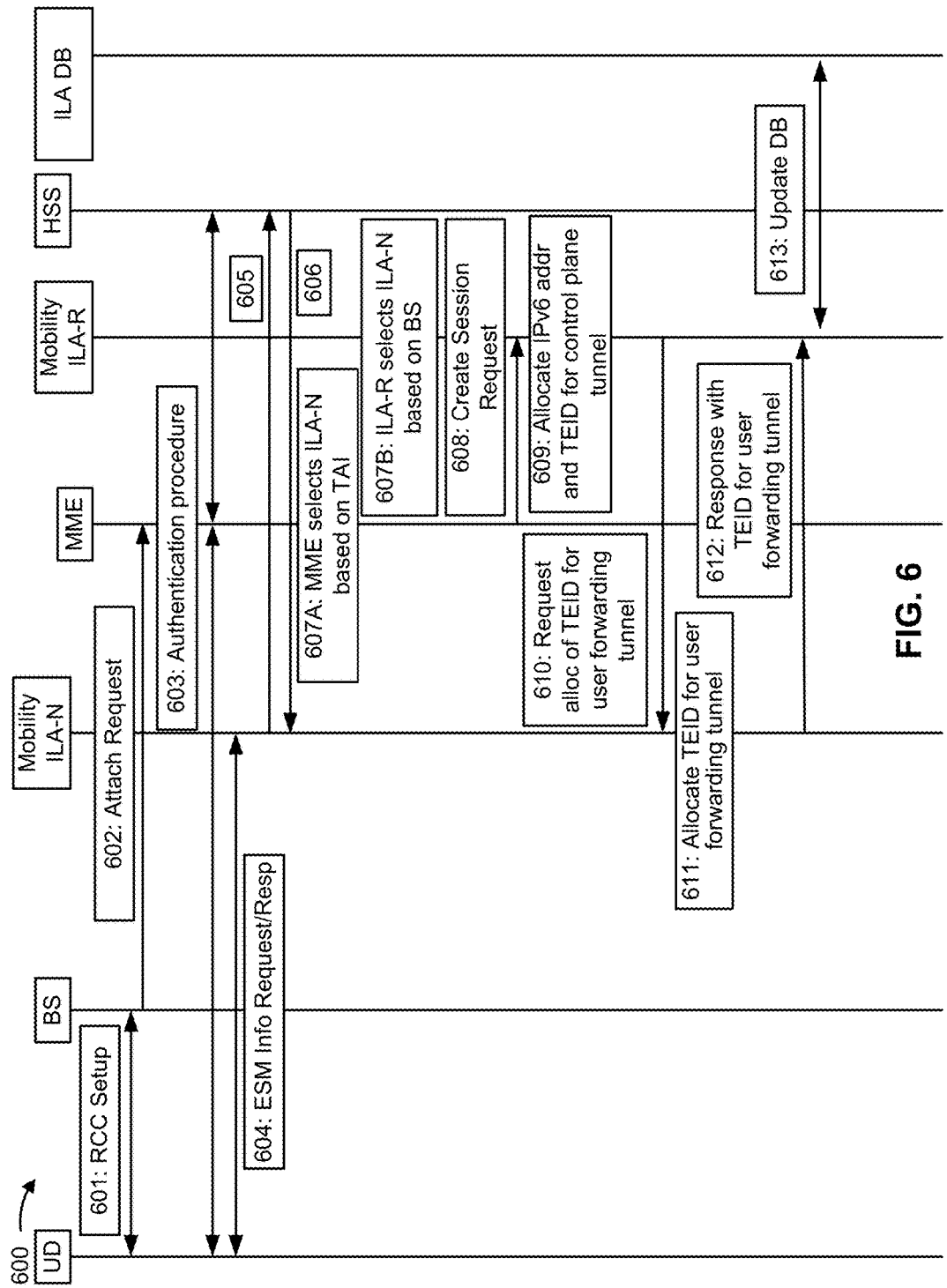
FIG. 6 is a diagram of an example implementation 600 for using ILA to establish an IP session, where an ILA node is used as an endpoint for a first tunnel and an ILA router is used as an endpoint for a second tunnel.

FIG. 6 is a call flow diagram of an example implementation 600 for using ILA to establish an IP session, where an ILA node 220 is used as an endpoint for a first tunnel (e.g., a control plane tunnel) and an ILA router 225 is used as an endpoint for a second tunnel (e.g., a user forwarding tunnel). In example implementation 600, ILA node 220 can be hosted near base station 210 as part of a C-RAN hub or can be hosted at a SAP.

As shown in FIG. 6, and by reference numbers 601-606, user device 205 can interact with one or more network devices (e.g., base station 210, ILA node 220, MME 215, ILA router 225, HSS/AAA 235, etc.) to begin to establish an IP session (the details of which are described elsewhere herein).

As shown by reference number 607A, MME 215 can select ILA node 220 based on a tracking area indicator (TAI) associated with user device 205. For example, if ILA node 220 is hosted at a SAP, then MME 215 can select ILA node 220 based on a TAI associated with user device 205 (e.g., in the same manner described with respect to FIGS. 1A-1F and FIG. 4). As shown by reference number 607B, MME can select ILA node 220 based on base station 210. For example, if ILA node 220 is hosted near base station 210 at a C-RAN hub, then MME 215 can select ILA node 220 based on the base station 210 that provides the connection request to MME 215 (e.g., in the same manner described with respect to FIG. 5).

As shown by reference number 608, MME 215 can provide a request to establish the IP session to ILA router 225. As shown by reference number 609, ILA router 225 can allocate an IPv6 address for user device 205 and a tunnel endpoint identifier of ILA node 220 for the first tunnel (e.g., the control plane tunnel).

As shown by reference number 610, ILA router 225 can provide a request to ILA node 220 for a tunnel endpoint identifier for ILA node 220 for the second tunnel (e.g., the user forwarding tunnel). As shown by reference number 611, ILA node 220 can allocate the tunnel endpoint identifier for ILA node 220 for the second tunnel. As shown by reference number 612, ILA node 220 can provide the tunnel endpoint identifier to ILA router 225.

As shown by reference number 613, ILA router 225 can update the data structure with tunnel endpoint identifiers. Additionally, while not shown, MME 215, ILA node 220, and ILA router 225 can interact to continue establishing the IP session, the same manner described elsewhere herein.

In this way, ILA node 220 and ILA router 225 are able to collectively use ILA to establish an IP session, whereby ILA node 220 supports the first tunnel (e.g., the control plane tunnel) and ILA router 225 supports the second tunnel (e.g., the user forwarding tunnel).

As indicated above, FIG. 6 is provided merely as an example. Other examples are possible and can differ from what was described with regard to FIG. 6.

Figure 7:
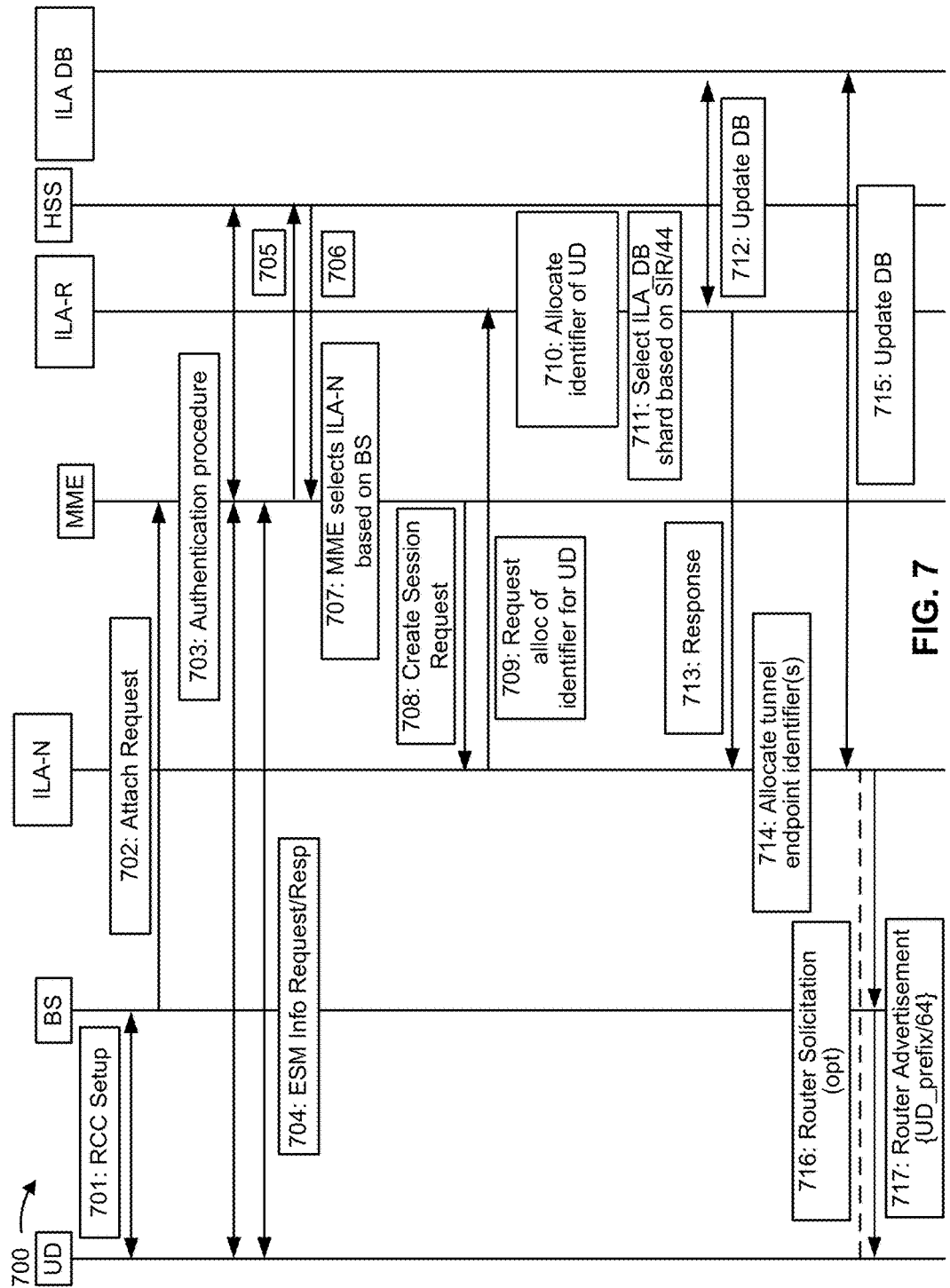
FIG. 7 is a diagram of an example implementation 700 for establishing an IP session using ILA and stateless address auto-configuration.

FIG. 7 is a call flow diagram of an example implementation 700 for establishing an IP session using ILA and stateless address auto-configuration. In example implementation 700, ILA node can be hosted near base station 210 as part of a C-RAN hub, or near MME 215 as part of a SAP.

As shown in FIG. 7, and by reference numbers 701-706, user device 205 can interact with one or more network devices (e.g., base station 210, ILA node 220, MME 215, ILA router 225, HSS/AAA 235, etc.) to begin to establish an IP session (the details of which are described elsewhere herein).

As shown by reference number 707, MME 215 can select an ILA node 220 based on a base station 210 that provides the connection request. For example, because the ILA node 220 is hosted near base station 210, MME 215 can select the ILA node 220 based on the particular base station 210 that receives the connection request. As shown by reference number 708, MME 215 can provide a request to establish the IP session to ILA node 220. The request can include a tunnel endpoint identifier for MME 215 for a first tunnel (e.g., a control plane tunnel).

As shown by reference number 709, ILA node 220 can provide, to ILA router 225, a request for an IPv6 address for user device 205. As shown by reference number 710, ILA router 225 can allocate an IPv6 interface identifier (UUID64) as a suffix of an IPv6 address for user device 205. In this case, the IPv6 interface identifier can include a first set of bits (e.g., 20 bits) associated with a unique identifier for the user device, and a second set of bits (e.g., 44 bits) associated with a unique location identifier (e.g., the sets of bits can vary to satisfy network slice requirements).

As shown by reference number 711, ILA router 225 can select an ILA data source 230 using the unique location identifier included in the IPv6 interface identifier. As shown by reference number 712, ILA router 225 can update the data structure to associate the IPv6 interface identifier with the device identifier of ILA node 220 and the 64-bit prefix.

As shown by reference number 713, ILA node 220 can receive, from ILA router 225, a response indicating that the IPv6 address has been allocated. As shown by reference number 714, ILA node 220 can allocate tunnel endpoint identifiers, in the same manner described elsewhere herein. As shown by reference number 715, ILA node 220 can update the data structure to associate the IPv6 address with the tunnel endpoint identifiers.

As shown by reference numbers 716-717, a router solicitation-router advertisement procedure can be executed. For example, user device 205 can execute a router solicitation technique wherein the IPv6 interface identifier is provided to network 240 (shown as to ILA node 220), which causes network 240 to send a router advertisement to user device 205. The router advertisement can include a 64-bit prefix that can then be used for the IPv6 address in place of the IPv6 interface identifier.

In this way, an IP session can be established using ILA and stateless address auto-configuration.

As indicated above, FIG. 7 is provided merely as an example. Other examples are possible and can differ from what was described with regard to FIG. 7. For example, example implementation 600 can be implemented in conjunction with example implementation 700. In this case, stateless address auto-configuration can be used with ILA to support an IP session with an architecture that uses ILA node 220 to support a first tunnel (e.g., a control plane tunnel) and uses ILA router 225 to support a second tunnel (e.g., a user forwarding tunnel).

In this way, ILA node 220 is able to support the IP session without storing a session state. Additionally, ILA node 220 is able to support the IP session without a PGW and without a SGW. Furthermore, ILA node 220 conserves storage resources by supporting IP sessions without storing session states. Additionally, ILA node 220 reduces a utilization of processing resources and/or conserves network resources by storing tunnel endpoint identifiers in cache memory, thereby avoiding additional routing lookups during the IP session.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
receive, from a network device, a request to establish an internet protocol (IP) session for a user device;
allocate at least one of:
an IP address for the user device, or
a first tunnel endpoint identifier associated with a tunnel that is to be used during the IP session,
the IP address including:
a first set of bits associated with a location identifier, and
a second set of bits associated with a device identifier;
provide a response to the network device to cause the network device to establish an uplink portion of the IP session,
the response including at least one of:
the IP address, or
the first tunnel endpoint identifier;
receive, from the network device, a request that includes a second tunnel endpoint identifier associated with the tunnel,
where the second tunnel endpoint identifier is associated with establishing a downlink portion of the IP session;
provide at least one of the IP address, the first tunnel endpoint identifier, or the second tunnel endpoint identifier to be stored using a data structure;
provide a response to the network device to cause the network device to establish the downlink portion of the IP session; and
perform one or more actions associated with managing the IP session,
where one or more of the IP address, the first tunnel endpoint identifier, or the second tunnel endpoint identifier are used to make routing decisions during the IP session.

2. The device of claim 1, where the device supports the IP session without storing session states by using identifier-locator addressing (ILA).

3. The device of claim 1, where the one or more processors are further to:
receive, after providing the response to the network device to cause the network device to establish the downlink portion of the IP session, a packet associated with the IP session,
the packet including the IP address of the user device as a source address and an IP address of another user device as a destination address; and
where the one or more processors, when performing the one or more actions associated with supporting the IP session, are to:
modify the IP address of the user device by replacing the first set of bits associated with the location identifier of the user device with a set of bits associated with an identifier of the device, and
provide the packet with the modified IP address via an IP network to a routing device, causing the routing device to provide the packet to the other user device.

4. The device of claim 1, where the one or more processors are further to:
receive, after providing the response to the network device to cause the network device to establish the downlink portion of the IP session, a packet associated with the IP session,
the packet including an IP address of another user device as a source address and a modified IP address of the user device as a destination address,
where the modified IP address includes a third set of bits associated with an identifier of the device; and
where the one or more processors, when performing the one or more actions associated with supporting the IP session, are to:
obtain, by searching the data structure, the IP address that includes the first set of bits associated with the location identifier of the user device,
replace the modified IP address with the IP address, and
provide the packet with the IP address to a base station via the tunnel.

5. The device of claim 1, where the one or more processors are further to:
receive, after providing the response to the network device to cause the network device to establish the downlink portion of the IP session, a packet associated with the IP session; and
when performing the one or more actions associated with supporting the IP session, are to:
obtain the IP address of the user device or the second tunnel endpoint identifier from cache memory, and
use the IP address or the second tunnel endpoint identifier to make routing decisions.

6. The device of claim 1, where the one or more processors are further to:
receive, from the network device, a request associated with a handover procedure,
the request associated with the handover procedure including a third tunnel endpoint identifier that is associated with a target base station; and
where the one or more processors, when performing the one or more actions associated with supporting the IP session, are to:
update the data structure by replacing the second tunnel endpoint identifier that is associated with a source base station with the third tunnel endpoint identifier that is associated with the target base station, and
provide, to the network device, a response indicating that the target base station is set as an endpoint to the tunnel.

7. The device of claim 1, where the one or more processors are further to:
receive, from the network device, a request associated with a timeout procedure,
where the timeout procedure is triggered when the user device remains in an idle state for a threshold time period; and
where the one or more processors, when performing the one or more actions associated with supporting the IP session, are to:
update the data structure by removing the second tunnel endpoint identifier,
the second tunnel endpoint identifier being associated with a base station that does not need to service the user device when the user device remains in the idle state for the threshold time period.

8. A non-transitory computer-readable medium storing instructions, the instructions comprising:
one or more instructions that, when executed by one or more processors, cause the one or more processors to:
receive, from a network device, a request to establish an internet protocol (IP) session for a user device;
allocate at least one of:
an IP address for the user device, or
a first tunnel endpoint identifier associated with a tunnel that is to be used during the IP session,
the IP address including:
a first set of bits associated with a location identifier, and
a second set of bits associated with a device identifier;
provide a response to the network device to cause the network device to establish an uplink portion of the IP session,
the response including at least one of:
the IP address, or
the first tunnel endpoint identifier;
receive, from the network device, a request that includes a second tunnel endpoint identifier associated with the tunnel,
where the second tunnel endpoint identifier is associated with establishing a downlink portion of the IP session;
provide at least one of the IP address, the first tunnel endpoint identifier, or the second tunnel endpoint identifier to be stored using a data structure; and
provide a response to the network device to cause the network device to establish the downlink portion of the IP session; and
perform one or more actions associated with managing the IP session,
where one or more of the IP address, the first tunnel endpoint identifier, or the second tunnel endpoint identifier are used to make routing decisions for traffic flow associated with the IP session.

9. The non-transitory computer-readable medium of claim 8, where the one or more instructions, when executed by the one or more processors, further cause the one or more processors to:
receive, after providing the response to the network device to cause the network device to establish the downlink portion of the IP session, a packet associated with the IP session,
the packet including the IP address of the user device as a source address and an IP address of a server device as a destination address; and
where the one or more processors, when performing the one or more actions associated with supporting the IP session, are to:
provide the packet to a routing device to cause the routing device to provide the packet to the server device.

10. The non-transitory computer-readable medium of claim 8, where the one or more instructions, that cause the one or more processors to receive the request to establish the IP session, cause the one or more processors to:
receive the request from the network device,
where the one or more processors are associated with a device that is one of a set of devices that collectively support traffic flow within a geographic region,
where the network device selects the device, of the set of devices, based on a geographic location of the user device, and
where the network device provides the request to establish the IP session to the device.

11. The non-transitory computer-readable medium of claim 8, where the one or more processors are associated with a device that is part of a cloud radio access network (C-RAN).

12. The non-transitory computer-readable medium of claim 8, where the one or more instructions, when executed by the one or more processors, further cause the one or more processors to:
receive, from the network device, a request associated with a handover procedure,
the request associated with the handover procedure including a third tunnel endpoint identifier that is associated with a target base station; and
where the one or more processors, when performing the one or more actions associated with supporting the IP session, are to:
update the data structure by replacing the second tunnel endpoint identifier that is associated with a source base station with the third tunnel endpoint identifier that is associated with the target base station, and
provide, to the other device, a response indicating that the target base station is set as an endpoint to the tunnel.

13. The non-transitory computer-readable medium of claim 8, where the one or more instructions, when executed by the one or more processors, further cause the one or more processors to:
receive, from the network device, a request associated with an attachment procedure,
where the attachment procedure is triggered by the user device returning from an idle state,
the request associated with the attachment procedure including another second tunnel endpoint identifier; and
where the one or more processors, when performing the one or more actions associated with supporting the IP session, are to:
update the data structure by adding the other second tunnel endpoint identifier, and
provide a response to the network device indicating that the IP session has been re-established.

14. A method, comprising:
receiving, by a device and from a network device, a request to establish an internet protocol (IP) session for a user device;

allocating, by the device, at least one of:
   an IP address for the user device, or
   a first tunnel endpoint identifier associated with a tunnel that is to be used during the IP session,
     the IP address including:
       a first set of bits associated with a location identifier, and
       a second set of bits associated with a device identifier;
providing, by the device, a response to the network device to cause the network device to establish an uplink portion of the IP session,
   the response including at least one of:
     the IP address, or
     the first tunnel endpoint identifier;
receiving, by the device and from the network device, a request that includes a second tunnel endpoint identifier associated with the tunnel,
   where the second tunnel endpoint identifier is associated with establishing a downlink portion of the IP session;
providing, by the device, at least one of the IP address, the first tunnel endpoint identifier, or the second tunnel endpoint identifier to be stored using a data structure;
providing, by the device and to the network device, a response to cause the network device to establish the downlink portion of the IP session; and
performing, by the device, one or more actions associated with managing the IP session,
   where one or more of the IP address, the first tunnel endpoint identifier, or the second tunnel endpoint identifier are used to make routing decisions for traffic flow associated with the IP session.

15. The method of claim 14, where the device supports the IP session by using identifier-locator addressing (ILA).

16. The method of claim 14, where the IP address is allocated using stateless address auto-configuration.

17. The method of claim 14, where the request includes a first tunnel endpoint identifier associated with another tunnel;
   where allocating at least one of the IP address for the user device or the first tunnel endpoint identifier associated with the tunnel comprises:
     allocating the IP address for the user device,
     allocating the first tunnel endpoint identifier associated with the tunnel, and
     allocating a second tunnel endpoint identifier associated with the other tunnel; and
   where performing the one or more actions comprises:
     performing the one or more actions associated with managing the IP session,
      where the IP address, the first tunnel endpoint identifier associated with the tunnel, the second tunnel endpoint identifier associated with the tunnel, the first tunnel endpoint identifier associated with the other tunnel, and the second tunnel endpoint identifier associated with the other tunnel are used to make routing decisions for traffic flow associated with the IP session.

18. The method of claim 14, further comprising:
receiving, after providing the response to the network device to cause the network device to establish the downlink portion of the IP session, a packet associated with the IP session,
   the packet including the IP address of the user device as a source address and an IP address of another user device as a destination address; and
where performing the one or more actions associated with supporting the IP session comprises:
   modifying the IP address of the user device by replacing the first set of bits associated with the location identifier of the user device with a set of bits associated with an identifier of the device, and
   providing the packet with the modified IP address via an IP network to a routing device, where the routing device provides the packet to the other user device.

19. The method of claim 14, further comprising:
receiving, after providing the response to the network device to cause the network device to establish the downlink portion of the IP session, a packet associated with the IP session; and
where performing the one or more actions associated with supporting the IP session comprises:
   obtaining the IP address of the user device or the second tunnel endpoint identifier from cache memory, and
   using the IP address or the second tunnel endpoint identifier to make routing decisions.

20. The method of claim 14, further comprising:
receiving, from the network device, a request associated with another IP session,
   the request associated with the other IP session being a request to replace another device and manage the other IP session;
updating the data structure by replacing an identifier associated with the other device with an identifier associated with the device; and
performing one or more actions associated with managing the other IP session.

* * * * *